(12) United States Patent
Yamamoto

(10) Patent No.: US 6,704,461 B1
(45) Date of Patent: Mar. 9, 2004

(54) IMAGE READING APPARATUS

(75) Inventor: Takashi Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/377,406

(22) Filed: Aug. 20, 1999

(30) Foreign Application Priority Data

Aug. 20, 1998 (JP) ............................................ 10-234435

(51) Int. Cl.⁷ ................................................. G06K 9/32
(52) U.S. Cl. ........................ 382/298; 382/312; 382/318; 382/319
(58) Field of Search ................................ 382/298, 312, 382/319, 318; 396/104; 355/41; 250/208.1; 358/518

(56) References Cited

U.S. PATENT DOCUMENTS

| | | | | |
|---|---|---|---|---|
| 5,014,123 A | * | 5/1991 | Imoto | 358/506 |
| 5,144,132 A | * | 9/1992 | Kitakado | 250/208.1 |
| 5,309,256 A | * | 5/1994 | Takada et al. | 358/504 |
| 5,585,886 A | * | 12/1996 | Yabe | 355/41 |
| 5,892,595 A | * | 4/1999 | Yamakawa et al. | 358/530 |
| 5,894,527 A | * | 4/1999 | Endo | 382/299 |
| 5,940,634 A | * | 8/1999 | Nakamura | 396/104 |
| 6,034,794 A | * | 3/2000 | Suganuma | 358/518 |
| 6,067,109 A | * | 5/2000 | Yamana | 348/104 |

FOREIGN PATENT DOCUMENTS

| | | | | |
|---|---|---|---|---|
| JP | 9-224128 | 8/1997 | | H04N/1/04 |
| JP | 10-155065 | 6/1998 | | H04N/1/19 |

OTHER PUBLICATIONS

Notice of Reasons For Rejection dated May 7, 2002.

* cited by examiner

Primary Examiner—Anh Hong Do
(74) Attorney, Agent, or Firm—Sughrue Mion, PLLC

(57) ABSTRACT

An image reading apparatus includes a plurality of reading sections (CCD elements) and reads a photographic photosensitive material by pre-set plural reading sections of the plurality of reading sections. In the image reading apparatus, on the basis of a value indicating an amount of deviation between an actual reading position and a predetermined proper reading position, the plural reading sections which read the photographic photosensitive material are suitably shifted from pre-set plural reading sections. Accordingly, even if a reading device deviates from its proper position, an entire range to be read of the photographic photosensitive material can be read. Specifically, first, a position H1, at which a reference position of the photographic photosensitive material is actually imaged on the reading device (a line CCD sensor), is fetched. Next, a proper imaging position H0, at which the reference position of the photographic photosensitive material should be imaged on the reading device, is fetched. An amount of deviation ΔH itself (i.e., a difference between the proper imaging position H0 and the actual imaging position H1) is calculated by the formula Δ H=H0−H1. Then, a range of CCD elements selected in advance to read only the photographic photosensitive material is moved, in a direction of eliminating the calculated deviation, by a number of CCD elements corresponding to the amount of deviation.

21 Claims, 19 Drawing Sheets

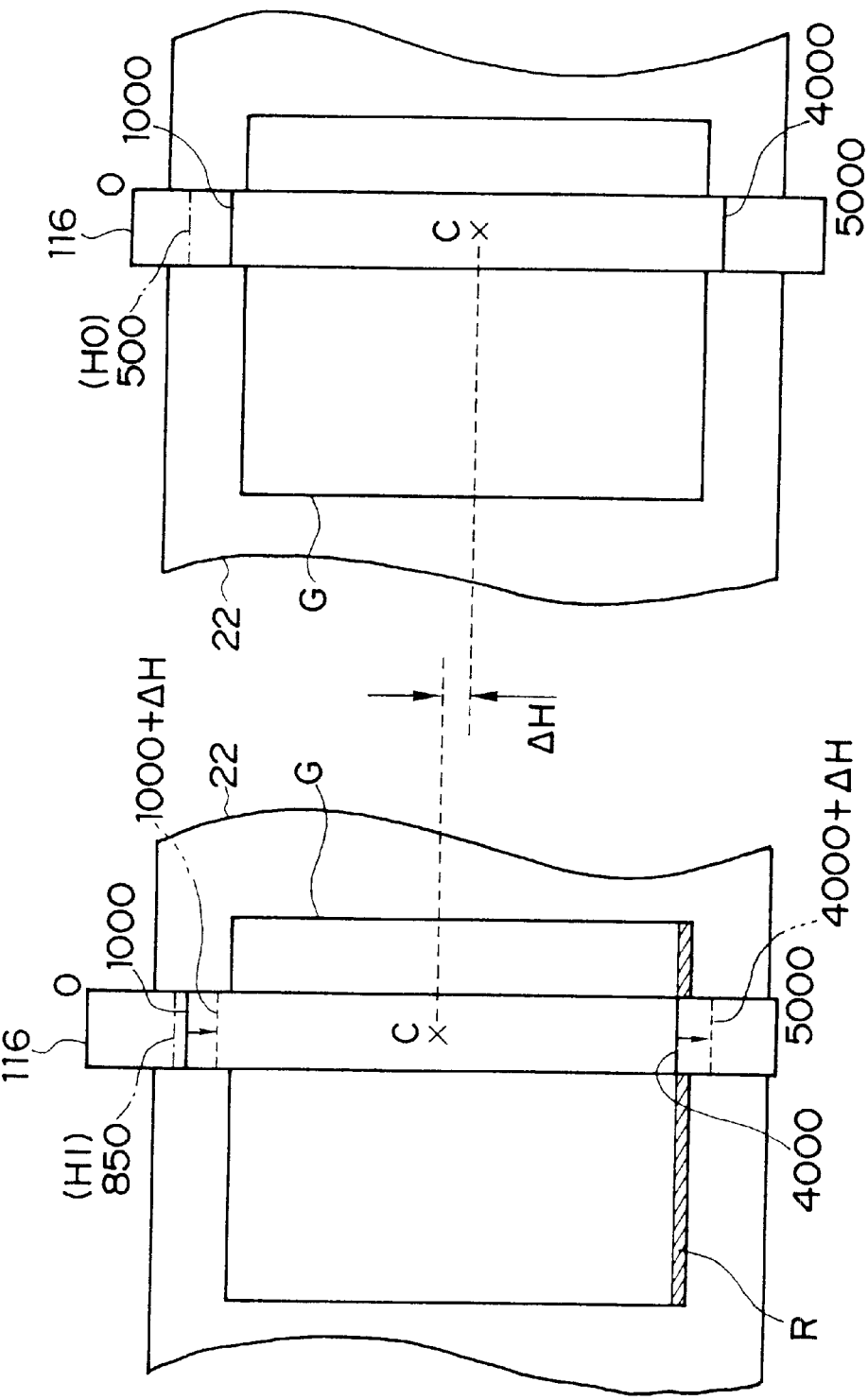

MAGNIFIED 1X

MAGNIFIED A X

WHEN POSITION IS SELECTED $n_o : K_o = n_x : (K_A + \Delta K_A)$

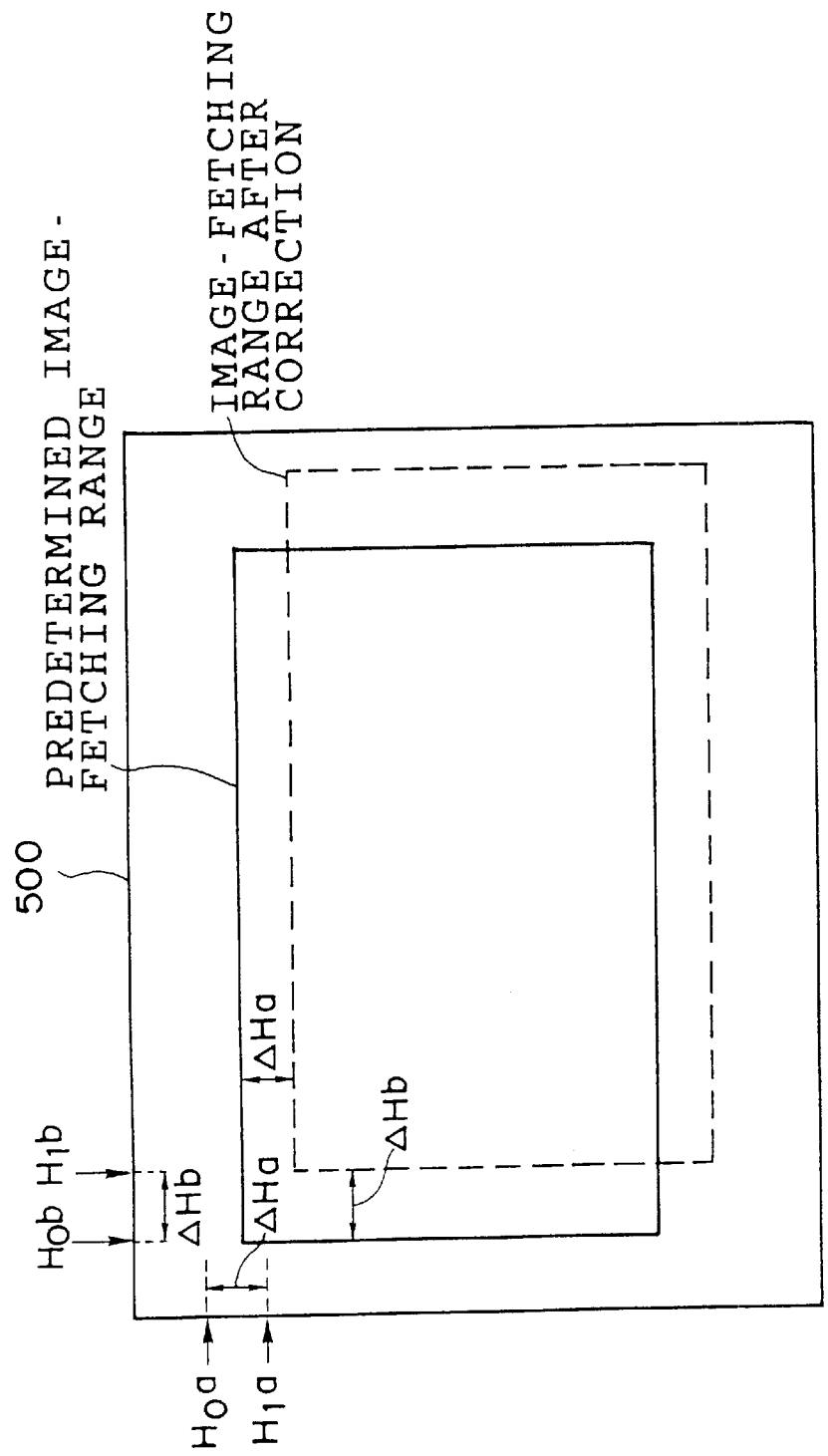

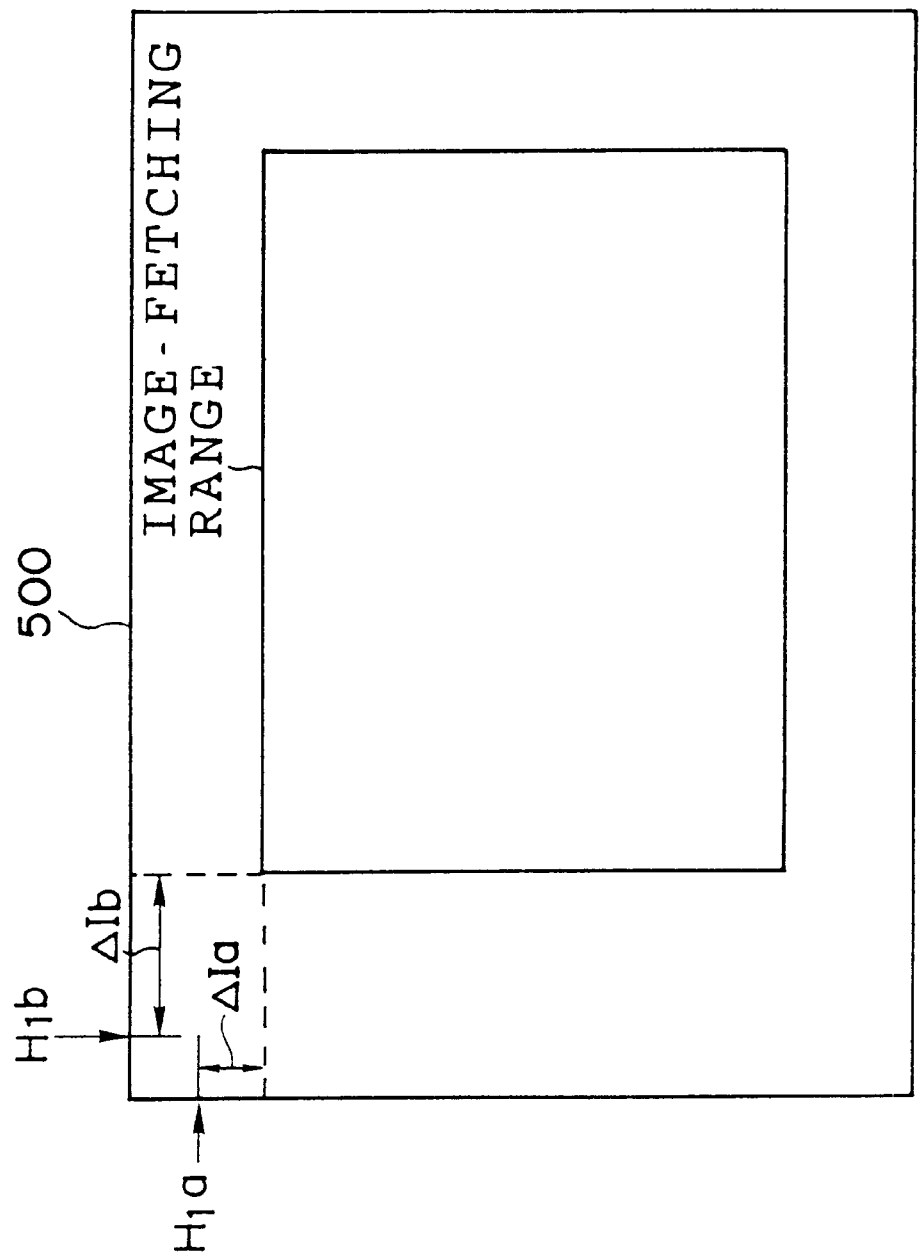

IMAGE READING APPARATUS

BACKGROUND OF THE INVENTION

1. Field of the Invention

The present invention relates to an image reading apparatus and more specifically to an image reading apparatus which includes a plurality of reading sections and reads a photographic photosensitive material by predetermined plural reading sections among the plurality of reading sections.

2. Description of the Related Art

There has been conventionally proposed an image reading apparatus in which a photographic film is conveyed by a film carrier, and the conveyed photographic film is read via an imaging lens by a CCD line sensor comprised of a plurality of CCD elements arrayed in a direction perpendicular to a conveying direction of the photographic film. In this type of image reading apparatus, a range of the photographic film to be read is read by predetermined plural CCD elements of the plurality of CCD elements such that images of unnecessary portions are not read.

In this image reading apparatus, when the photographic film is read with the magnification thereof changed (i.e., enlargement or reduction thereof is carried out), the CCD line sensor is moved so as to approach and away from the photographic film.

However, since the CCD line sensor is movable with respect to the photographic film as described above, due to vibration or the like, the positions of the CCD line sensor, the imaging lens (the optical axis), the film carrier, and the like may deviate from their proper positions. When the CCD line sensor and the like deviate from their proper positions, the reading range, which is read by the predetermined plural CCD elements of the plurality of CCD elements, deviates from the range of the photographic film to be read. As a result, the range of the photographic film to be read cannot be read.

In order to solve this problem, there has been considered a structure in which the CCD line sensor and the photographic film are mechanically moved, but the mechanical structure thereof is complex.

SUMMARY OF THE INVENTION

The present invention was devised in order to solve the above-described drawbacks, and an object of the present invention is to provide an image reading apparatus which is able to read a photographic photosensitive material properly.

To accomplish the above-described object, an image reading apparatus of the first aspect of the present invention comprises: reading means including a plurality of reading sections, the reading sections reading an image of a reference position which is used as reference with respect to a photographic photosensitive material imaged thereon; and determination means for determining a range of the plurality of the reading sections for reading the photosensitive material. The determination means includes: calculation means which calculates a value which indicates an amount of deviation between an actual reading position, at which the reference position is actually imaged and read by said reading means, and a proper reading position, at which the reference position should be imaged and read; and changing means which changes the range of the plural reading sections for reading the photographic photosensitive material from an initially determined range of the plurality of the reading sections to another range, on the basis of the value indicating the amount of deviation calculated by said calculation means.

Further, in a second aspect of the present invention, the changing means changes the range of the plural reading sections selected for reading the photosensitive material in a direction in which the amount of deviation is eliminated, so that at least the predetermined range to be read of the photosensitive material is read by the range of the plural reading sections.

According to the first and second aspects of the present invention, on the basis of a value indicating the amount of deviation between an actual reading position and a predetermined proper reading position, a plurality of reading sections which read a photosensitive material are shifted from predetermined plural reading sections in a direction in which the deviation is eliminated and within a range in which the deviation is eliminated. Accordingly, even if the reading means deviates from its proper position, the entire range to be read of the photosensitive material can be reliably read.

In a third aspect of the present invention, the image reading apparatus further comprises conveying means which conveys the photosensitive material, wherein the plural reading sections are disposed in a direction intersecting a conveying direction of the photosensitive material, and the reading means reads the photosensitive material at the time of conveying of the photosensitive material by the conveying means.

The reading time can be reduced because a plurality of reading sections, which are aligned in a direction intersecting the direction in which the photosensitive material is conveyed, read the photosensitive material during the conveying thereof.

In a fourth aspect of the present invention, the reading means carries out preliminary reading (pre-scan) and main reading (fine-scan) of the photosensitive material conveyed by the conveying means, and the determination means carries out the determination after the reading means completes the preliminary reading and before the reading means begins the main reading.

In a fifth aspect of the present invention, the determination means carries out the determination for each of the images recorded on the photographic photosensitive material at at least one of the following points in time: before each image frame is read; each time an image frame is read in the main scan direction; each time the conveying means is mounted; each time the conveying means is removed; and each time an image is read at a changed magnification.

In accordance with a sixth aspect of the present invention, the present invention further comprises imaging means which is able to image an image recorded on the photographic photosensitive material on the reading means at an enlarging/reducing magnification; and adjusting means which adjusts the imaging means such that the image recorded on the photographic photosensitive material is imaged on the reading means at an enlarging/reducing magnification; wherein the determination means carries out the determination each time the imaging means is adjusted by the adjusting means. Namely, the imaging means is adjusted by the adjusting means. For example, the imaging means is made to approach and move away from the photographic photosensitive material by the adjusting means. When the imaging means is formed by a combination of lenses, the distance between the lenses is changed by the adjusting means. In this way, the photographic photosensitive material is imaged to the reading means at an enlarging/reducing magnification. At this time, the changing means may carry out change each time the imaging means is adjusted by the adjusting means.

In accordance with a seventh aspect of the present invention, the reading means may be photo-receiving-elements-for-reading. An appropriate number of photo-receiving-elements-for-reading necessary for the reading means to read the photographic photosensitive material after the magnification has been changed, is calculated on the basis of a number of photo-receiving-elements-for-reading necessary for the reading means to read at a predetermined magnification a reference region including the reference position, a number of photo-receiving-elements-for-reading necessary for the reading means to read the photographic photosensitive material at a predetermined magnification, and an actual number of photo-receiving-elements-for-reading necessary for the reading means to read the reference region after the magnification is changed (i.e., after the imaging means is adjusted by the adjusting means).

Then, a range of a plurality of photo-receiving elements to read the photographic photosensitive material is determined by said determination means on the basis of the calculated number of photo-receiving-elements-for-reading necessary for the reading means to read the photographic photosensitive material, an actual number of photo-receiving-elements-for-reading necessary for the reading means to read the reference region after the magnification has been changed, and the position of photo-receiving elements which read the reference region.

In accordance with the seventh aspect, the appropriate number of photo-receiving-elements-for-reading, for reading the photographic photosensitive material, which number overcomes the magnification error caused by the deviation of the imaging means, can be obtained. Therefore, all regions of the photographic photosensitive material to be read can be reliably read regardless of the magnification error due to the deviation of the imaging means.

In an eighth aspect of the present invention, the present invention further comprises imaging means which is able to image an image recorded on the photographic photosensitive material on the reading means at an enlarging/reducing magnification; adjusting means which adjusts the imaging means such that the image recorded on the photographic photosensitive material is imaged on the reading means at an enlarging/reducing magnification; and control means which controls the position of the adjusting means so that the imaging means is adjusted, on the basis of the number of photo-receiving-elements-for-reading necessary for said reading means to read at a predetermined magnification the reference region including the reference position, a number of photo-receiving-elements-for-reading necessary for the reading means to read the photographic photosensitive material at a predetermined magnification, and the actual number of photo-receiving-elements-for-reading necessary for the reading means to read the reference region after the magnification has been changed.

In accordance with the eighth aspect, the magnification error between the desired set magnification and the actual magnification is calculated on the basis of the number of photo-receiving-elements-for-reading necessary for the reading means to read at predetermined magnification the reference region including the reference position, the number of photo-receiving-elements-for-reading necessary for the reading means to read the photographic photosensitive material at a predetermined magnification, and the actual number of photo-receiving-elements-for-reading necessary for the reading means to read the reference region after the magnification is changed. By using the determined magnification error, the amount of adjustment by which the imaging means is to be adjusted in order to image the photographic photosensitive material to the reading means at the desired set magnification is determined. Accordingly, the imaging means is adjusted by the adjusting means on the basis of this amount of adjustment. Because the imaging means is readjusted in accordance with the magnification error, the photographic photosensitive material can be read at the proper magnification.

BRIEF DESCRIPTION OF THE DRAWINGS

FIGS. 11A and 11B are explanatory views (schematic diagrams) for explaining correction of the image-fetching range by the line CCD scanner.

FIG. 18 is an explanatory view (a schematic diagram) for explaining the correction of the image-fetching range by an area CCD scanner.

FIG. 19 is an explanatory view (a schematic diagram) for explaining the correction of the image-fetching range by an area CCD scanner in accordance with a modified example.

DESCRIPTION OF THE PREFERRED EMBODIMENTS

Embodiments of the present invention will be explained in detail hereinafter with reference to the drawings.

Figure 1:
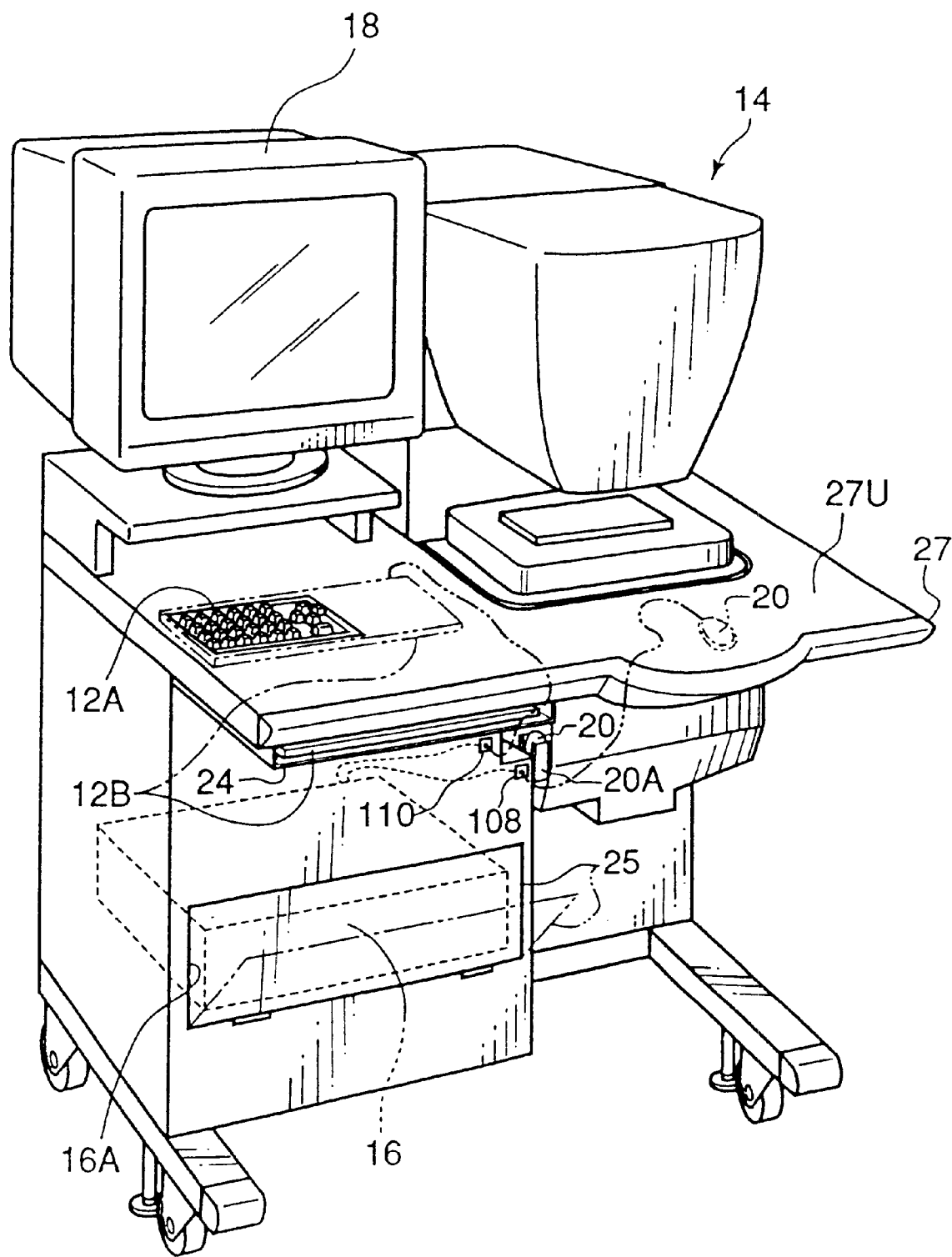
FIG. 1 is a view of the exterior of a line CCD scanner which is an example of an image reading apparatus of the present invention.

As illustrated in FIG. 1, a line CCD scanner (an image reading apparatus) 14 according to the present embodiment is provided on a work table 27. The work table 27 is provided with an image processing section 16, a mouse 20, two types of keyboards 12A and 12B, and a display 18.

One keyboard 12A is embedded within a work surface 27U of the work table 27. The other keyboard 12B is accommodated within a drawer 24 of the work table 27 when not used. When the keyboard 12B is used, it is taken out of the drawer 24 and is placed upon the keyboard 12A. At this time, a cord of the keyboard 12B is connected to a jack 110 connected to the image processing section 16.

A cord of the mouse 20 is connected to the image processing section 16 through an hole 108 formed in the work table 27. The mouse 20 is accommodated within a mouse holder 20A when not used. When the mouse 20 is used, it is taken out of the mouse holder 20A and is placed on the work surface 27U.

The image processing section 16 is accommodated within an accommodating portion 16A provided at the work table 27 and is closed therein by an opening/closing door 25. The image processing section 16 can be taken out from the accommodating portion 16A by opening the opening/closing door 25.

The line CCD scanner 14 is used to read a film image recorded on a photographic photosensitive material such as a photographic film including a negative film and a reversal film and the like. Examples of the photographic film on which a film image to be read is recorded include 135 size photographic films, 110 size photographic films, and photographic films on which a transparent magnetic layer is formed (i.e., 240 size photographic films, so-called "APS films"), and 120 size photographic films and 220 size photographic films (Brownie size). The line CCD scanner 14 reads the film image to be read by a line CCD and outputs image data.

Here, the photographic film refers to a film which, after shooting a subject, is subjected to developing processing such that a negative image or a positive image is made visible thereon.

Image data outputted from the line CCD scanner 14 is inputted to the image processing section 16. The image processing section 16 carries out image processings including various corrections and the like on the inputted image data, and outputs processed image data to an unillustrated laser printer section as image data for recording.

Figure 2:
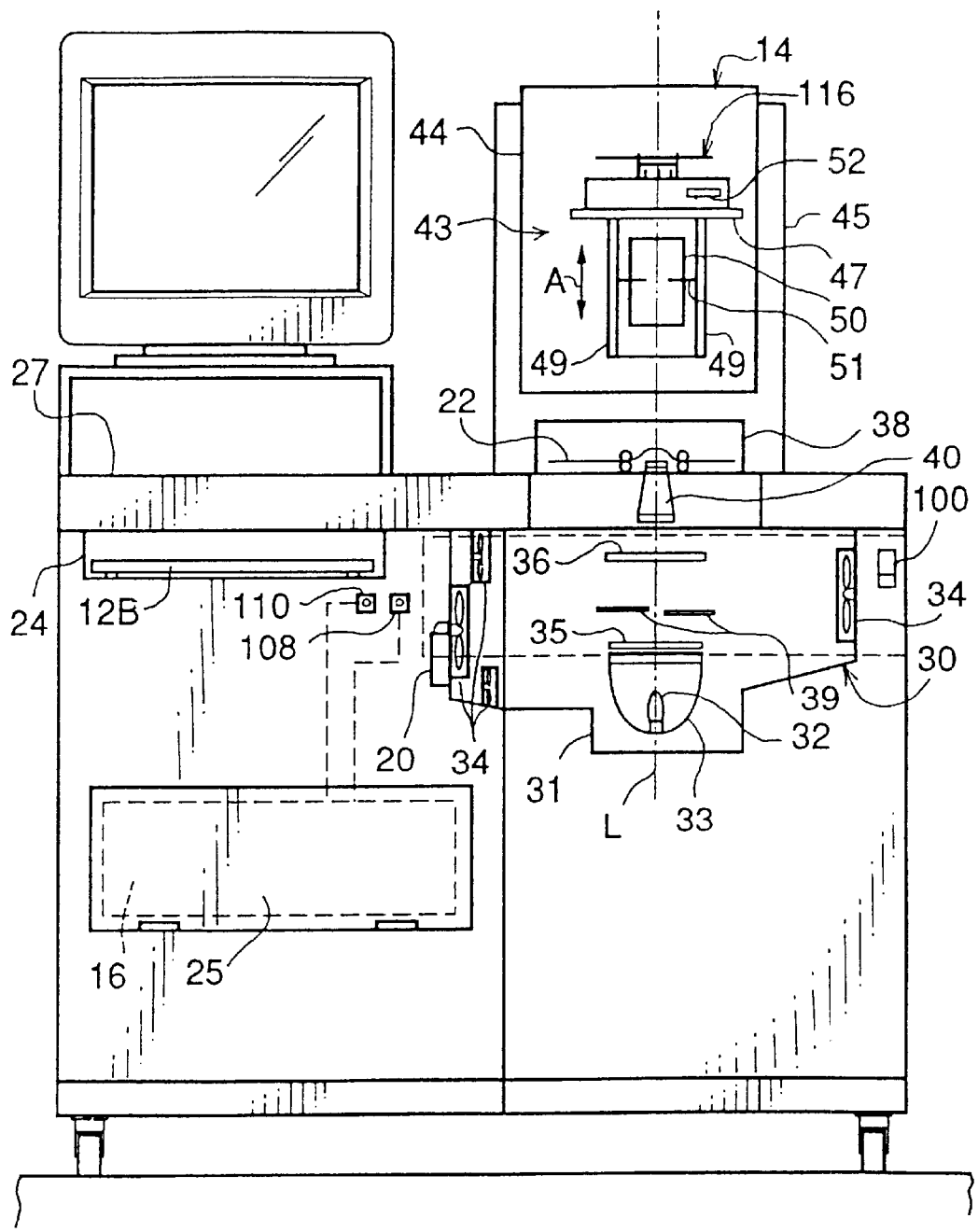
FIG. 2 is a front cross-sectional view of an optical system of the line CCD scanner shown in FIG. 1.
Figure 3:
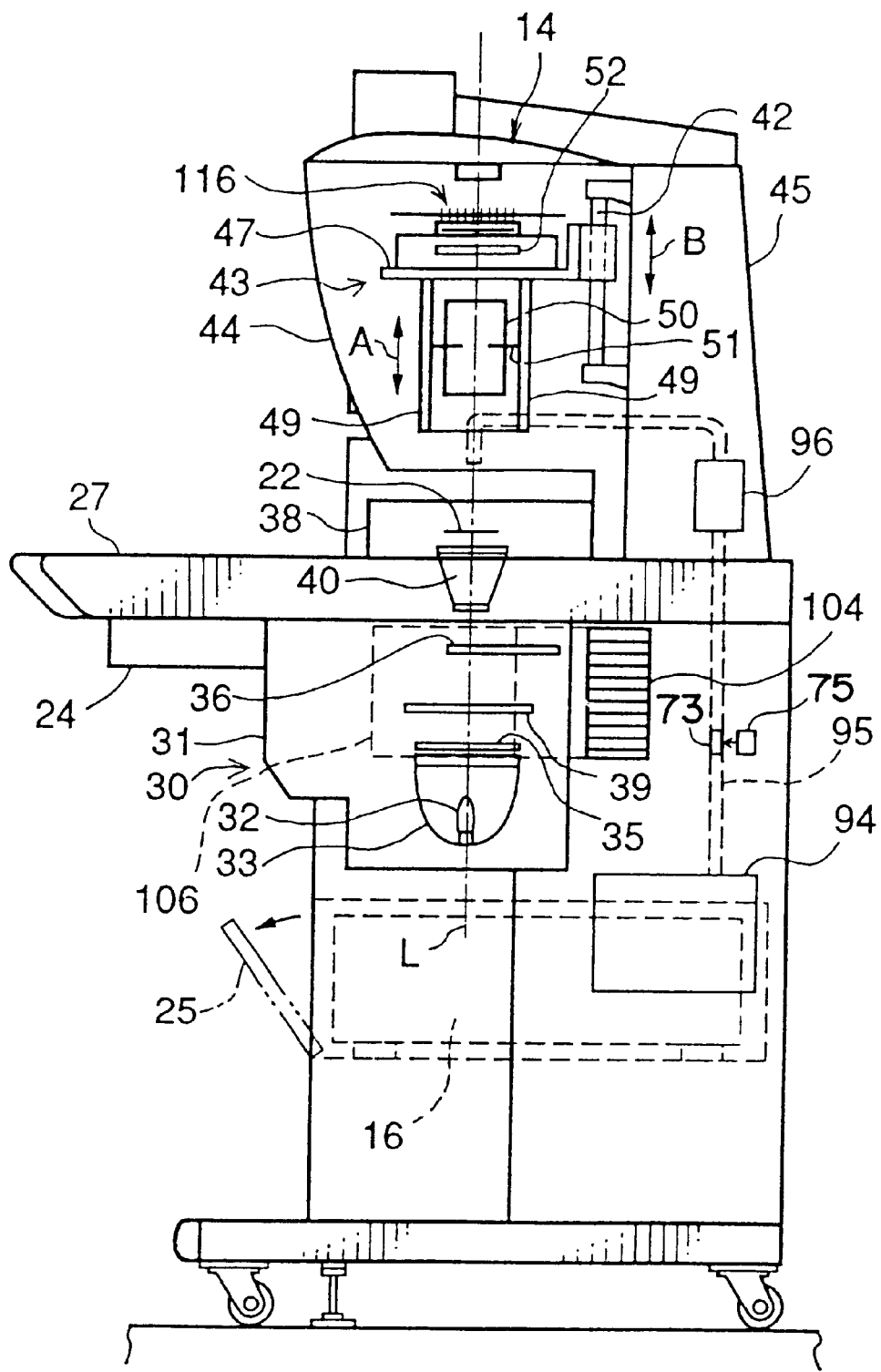
FIG. 3 is a side cross-sectional view of the optical system of the line CCD scanner shown in FIG. 1.

As shown in FIGS. 2 and 3, the optical system of the line CCD scanner 14 includes a light source section 30 which is disposed below the work table 27, a diffusion box 40 which is supported by the work table 27, a film carrier 38 which is set on the work table 27, and a reading section 43 which is disposed at the side of the work table 27 opposite the side at which the light source section 30 is disposed.

The light source section 30 is accommodated within a metallic casing 31. A lamp 32, which is a halogen lamp, a metal halide lamp, or the like, is disposed within the casing 31.

A reflector 33 is disposed around the lamp 32. A portion of light emitted from the lamp 32 is reflected by the reflector 33 and is emitted in a fixed direction. A plurality of fans 34 are disposed at the sides of the reflector 33. The fans 34 are actuated when the lamp 32 is turned on to prevent the overheating of the interior of the casing 31.

A UV/IR cut-off filter 35, a diaphragm 39, and a turret 36 (see FIG. 4B also) are disposed in that order at the light emission side of the reflector 33 along an optical axis L of light emitted from the reflector 33. The UV/IR cut-off filter 35 cuts off light of wavelengths in the ultraviolet and infrared ranges so as to prevent chemical changes and an increase in the temperature of the photographic film 22 to improve reading accuracy. The diaphragm 39 adjusts the amounts of light from the lamp 32 and light reflected off the reflector 33. Fitted into the turret 36 are a balance filter 36N for negative films and a balance filter 36P for reversal films, which properly set color components of light reaching the photographic film 22 and the reading section 43 in accordance with types of photographic films (negative films/reversal films).

Figure 4:
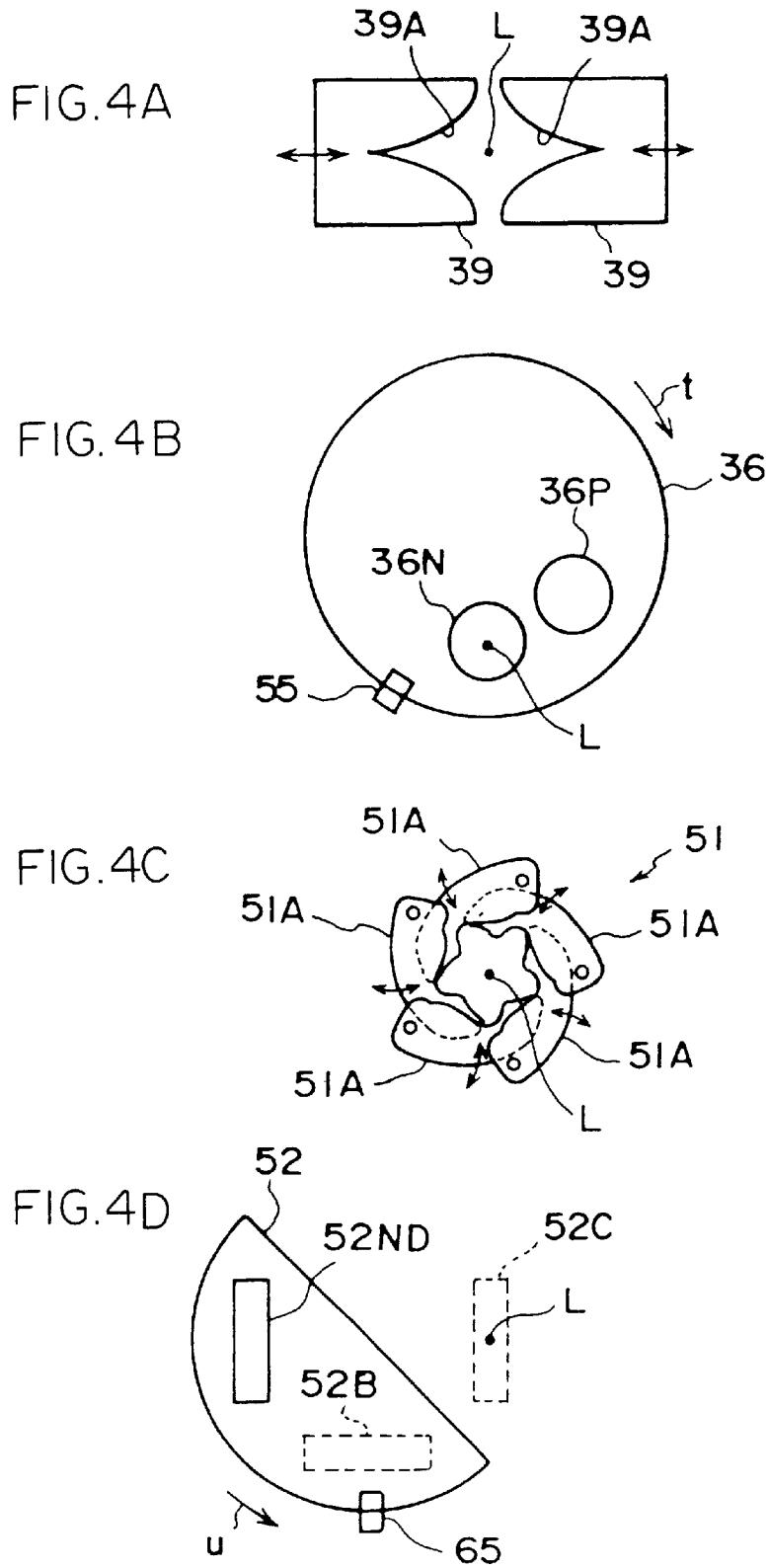
FIG. 4A is a plan view which shows an example of a diaphragm.
FIG. 4B is a plan view which shows an example of a turret.
FIG. 4C is a plan view which shows an example of a aperture stop.
FIG. 4D is a plan view which shows an example of a CCD shutter.

The diaphragm 39 is formed from a pair of plate members (diaphragm plates) which are disposed on either side of the optical axis L and are provided to move sidably so that the pair of plate members move close to and away from each other. As shown in FIG. 4A, the pair of plate members of the diaphragm 39 each has a notch 39A formed at one end of the plate member from the one end toward the other end in the sliding direction of the diaphragm 39 so that the cross-sectional area of the plate member along the direction perpendicular to the sliding direction varies continuously. These plate members are disposed in such a manner that the sides thereof in which the notches 39A are formed face each other.

In the above-described structure, either of the filters (36N, 35P) is positioned on the optical axis L depending on the type of the photographic film so as to realize light of desired light components. The amount of light transmitted through the diaphragm 39 is adjusted to the desired amount in accordance with the position of the diaphragm 39.

The light diffusion box 40 is formed such that, toward the upper portion thereof, i.e., toward the photographic film 22, the dimension of the diffusion box 40 in a direction in which the photographic film 22 is conveyed by the film carrier 38 gradually decreases (see FIG. 2) and the dimension of the diffusion box 40 in a direction perpendicular to the direction in which the photographic film 22 is conveyed (i.e., the transverse direction of the photographic film 22) gradually increases (see FIG. 3). Further, light diffusion plates (not shown) are respectively mounted at the light-entering side and the light-exiting side of the light diffusion box 40. Here, although the above-described light diffusion box 40 is used for 135 size photographic films, other diffusion boxes (not illustrated) formed so as to correspond other photographic films may also be prepared and used.

Light entering in the light diffusion box 40 is directed toward the film carrier 38 (i.e., the photographic film 22), made into slit light whose longitudinal direction coincides with the transverse direction of the photographic film 22, and further is made into diffused light by the light diffusion plates and is finally emitted. Due to light emitted from the light diffusion box 40 being made into diffused light as described above, nonuniformity in the amount of light illuminated onto the photographic film 22 is reduced and a uniform amount of slit light is illuminated onto the film image. Even if the film image is scratched, the scratches do not result in any conspicuous adverse effects.

The film carrier 38 and the light diffusion box 40 are provided for each type of the photographic film 22 and are selected in accordance with the photographic film 22.

Elongated openings (not shown), which are longer than the width of the photographic film 22, are formed in the top and bottom surfaces of the film carrier 38 along the transverse direction of the photographic film 22 at positions corresponding to the optical axis L. Slit light from the light diffusion box 40 is irradiated onto the photographic film 22 through the opening provided in the bottom surface of the film carrier 38, and the light transmitted through the photographic film 22 reaches a reading section 43 through the opening provided in the top surface of the film carrier 38.

The film carrier 38 is provided with a guide (not shown) which guides the photographic film 22 such that the photographic film 22 is bent at the position at which the slit light is illuminated from the diffusion box 40 (i.e., at the reading position). As a result, the flatness of the photographic film 22 is ensured at the reading position.

The light diffusion box 40 is supported so that the upper surface thereof is near the reading position. Accordingly, a cut-off portion is formed at the bottom surface of the film carrier 38 such that the film carrier 38 does not interfere with the light diffusion box 40 when the film carrier 38 is loaded.

The film carrier 38 is structured in such a manner as to be able to convey the photographic film 22 at a plurality of speeds which correspond to the conditions including the density of the film image to be scanned at the time of pre-scanning and fine-scanning.

A reading section 43 is accommodated within a casing 44. A mount 47 is provided within the casing 44. A line CCD 116 is mounted on the upper surface of the mount 47. A plurality of lens cylinders 49 hang down from the mount 47. Within each lens cylinders 49, a lens unit 50 is supported so as to be sidably movable in the directions of arrow A such that the lens unit 50 approaches and moves away from the work table 27 in order to change the magnification such as reduction/enlargement or the like. A supporting frame 45 is formed upright on the work table 27. The mount 47 is supported by a guide rail 42 mounted to the supporting frame 45 such that the mount 47 is be slidably movable in the directions of arrow B in which the mount 47 approaches and moves away from the work table 27 in order to ensure the conjugate length at the time of changing of magnification and automatic focusing. The lens unit 50 is comprised of a plurality of lenses and a aperture stop 51 is provided between these lenses. As illustrated in FIG. 4C, the aperture stop 51 includes a plurality of diaphragm plates 51A each having a substantially C-shaped configuration. These diaphragm plates 51A are disposed uniformly around the optical axis L and one end portion of each of the diaphragm plates 51A is supported by a pin so that the diaphragm plates 51A can rotate around the pins. The plurality of diaphragm plates 51A are connected together via a link (not shown). When driving force of a diaphragm plate-driving motor (which will be described later) is transmitted to the diaphragm plates 51A, the diaphragm plates 51A rotate in the same direction. Due to the rotation of the diaphragm plates 51A, the surface area of a portion around the optical axis L, in which light is not blocked by the diaphragm plates 51A (the substantially star-shaped portion shown in FIG. 4C), varies and the amount of light transmitted through the aperture stop 51 thereby varies.

A line CCD 116 is structured such that sensing portions, in each of which a large number of photoelectric conversion elements (referred to CCD elements hereinafter) such as CCD cells or photodiodes are disposed in one row along the transverse direction of the photographic film 22 and an electronic shutter mechanism is disposed, are provided in three lines which are parallel to each other and set apart from each other at intervals. Color separation filters of R, G, and B are mounted on the light-incidence sides of the corresponding sensing portions (i.e., the line CCD 116 is a so-called three-line color CCD). Further, a transmitting portion is provided in a vicinity of each sensing portion so as to correspond to the sensing portion. The charge accumulated in each of the CCD cells of each sensing portion is transmitted in order via the corresponding transmitting portion.

A CCD shutter 52 is disposed on the light-incidence side of the line CCD 116. As shown in FIG. 4D, an ND filter 52ND is fitted into the CCD shutter 52. The CCD shutter 52 rotates in the direction indicated by the arrow u and is switched between a full-closed state in which light to be made incident on the line CCD 116 is shaded for carrying out darkness-correction (i.e., a portion 52B, into which the ND filter 52ND is not fitted, or the like is positioned at a position 52C including the optical axis L), a full-open state in which light is allowed to be incident onto the line CCD 116 for carrying out regular reading or lightness-correction (i.e., the position shown in FIG. 4D), and a light decreased state in which light to be made incident on the line CCD 116 is decreased by the ND filter 52ND (i.e., the ND filter 52ND is positioned at the position 52C).

As shown in FIG. 3, a compressor 94, which generates cooling air for cooling the photographic film 22, is disposed at the work table 27. The cooling air generated by the compressor 94 is guided and supplied by a guide tube 95 to an unillustrated reading section of the film carrier 38. As a result, the range of the photographic film 22 positioned at the reading section can be cooled. The guide tube 95 passes through a flow rate sensor 96 which detects the flow rate of the cooling air. The sensor is not limited to the flow rate sensor, and a sensor for detecting the air speed of the cooling air or a pressure sensor for detecting the pressure may be provided.

Figure 5:
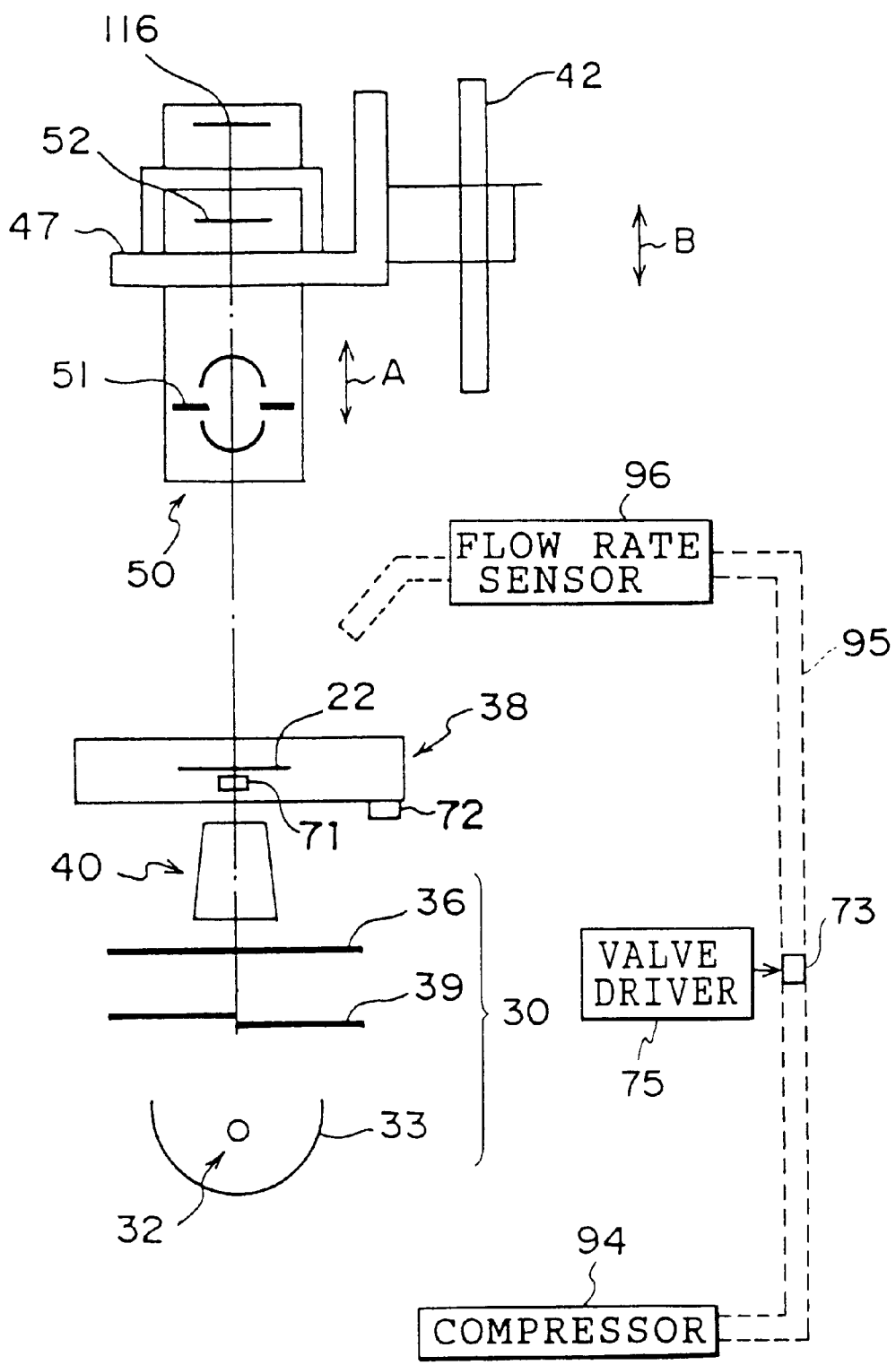
FIG. 5 is a view which shows only main portions of the optical system of the line CCD scanner.
Figure 6:
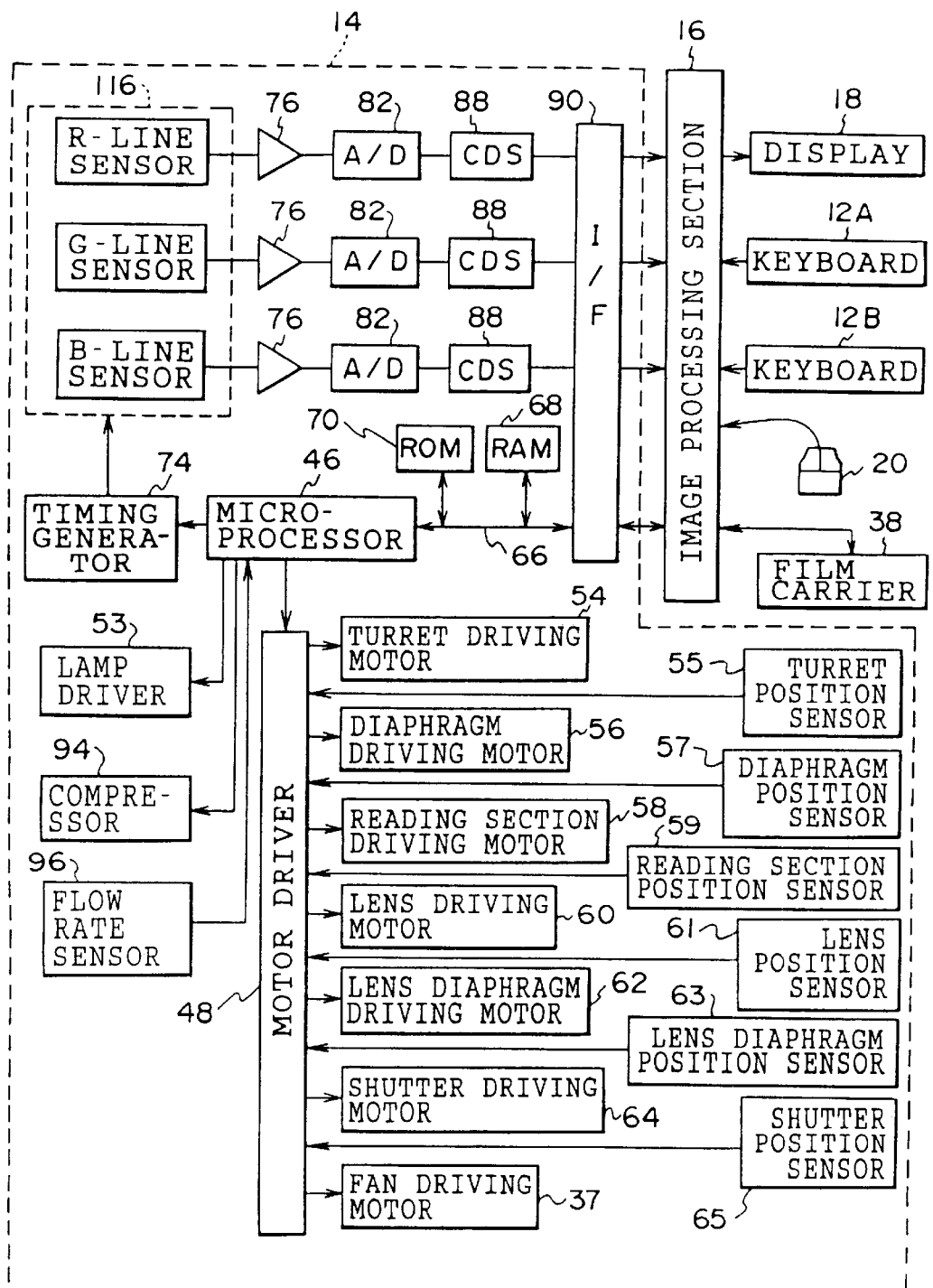
FIG. 6 is a block diagram which schematically shows the structure of an electric system of the line CCD scanner.

Referring to FIG. 6, a description will be given of a schematic structure of the electric system of the line CCD scanner 14 and the image processing section 16 with reference to the main portions of the optical system of the line CCD scanner 14 shown in FIG. 5.

The line CCD scanner 14 includes a microprocessor 46 which carries out control of the entire line CCD scanner 14. A RAM 68 (for example, an SRAM) and a ROM 70 (for example, a ROM whose stored contents are rewritable) are connected via a bus 66 to the microprocessor 46. A lamp driver 53, the compressor 94, the flow rate sensor 96 and a motor driver 48 are also connected to the microprocessor 46. The lamp driver 53 turns the lamp 32 on and off in accordance with instructions from the microprocessor 46. When a film image of the photographic film 22 is read, the microprocessor 46 operates the compressor 94 so that cooling air is supplied to the photographic film 22. The flow rate sensor 96 detects the flow rate of cooling air and the microprocessor 46 detects, if any, abnormalities.

A turret driving motor 54 and a turret position sensor 55 are connected to the motor driver 48. The turret driving motor 54 drives the turret 36 to rotate in the direction indicated by the arrow t shown in FIG. 4B so that either the balance filter 36N for negative films or the balance filter 36P for reversal films is positioned on the optical axis L. The turret position sensor 55 (see FIG. 4B also) detects a reference position (an unillustrated cut-out) of the turret 36. Further, also connected to the motor driver 48 are a diaphragm driving motor 56, a diaphragm position sensor 57, a reading-section driving motor 58, a reading-section position sensor 59, a lens driving motor 60, a lens position sensor 61, a diaphragm plate-driving motor 62, an aperture-stop position sensor 63, a shutter driving motor 64, a shutter position sensor 65, and a fan driving motor 37. The diaphragm driving motor 56 slides the diaphragm 39, and the diaphragm position sensor 57 detects the position of the diaphragm 39. The reading-section driving motor 58 slides the mount 47 (i.e., the line CCD 116 and the lens unit 50) along the guide rail 42, and the reading-section position sensor 59 detects the position of the mount 47. The lens driving motor 60 slides the lens unit 50 along the lens cylinder 49, and the lens position sensor 61 detects the position of the lens unit 50. The diaphragm plate-driving motor 62 rotates the diaphragm plates 51A of the aperture-stop 51, and the aperture-stop position sensor 63 detects the position of the aperture-stop 51 (i.e., the position of the diaphragm plates 51A). The shutter driving motor 64 switches the CCD shutter 52 between the full-closed state, the full-open state, and the light decreased state. The shutter position sensor 65 detects the position of the shutter. The fan driving motor 37 drives the fans 34.

During pre-scan (preliminary reading) and fine-scan (main reading) by the line CCD 116, based on the respective positions of the turret 36 and the diaphragm 39, which are detected by the turret position sensor 55 and the diaphragm position sensor 57, the microprocessor 46 drives the turret driving motor 54 to rotate the turret 36 and also drives the driving motor 56 to slide the diaphragm 39, thereby allowing adjustment of the light illuminated onto the film image.

Further, the microprocessor 46 determines the zoom magnification in accordance with the size of the film image or depending on whether trimming is to be carried out, and has the reading-section driving motor 58 slide the mount 47 on the basis of the position of the mount 47 detected by the reading-section position sensor 59 so that the film image can be read by the line CCD 116 at the determined zoom magnification. Further, the microprocessor 46 has the lens driving motor 60 slide the lens unit 50 on the basis of the position of the lens unit 50 detected by the lens position sensor 61.

When focusing control (automatic focusing control) is carried out to make the light receiving surface of the line CCD 116 coincide with an imaging position of the film image by the lens unit 50, the microprocessor 46 slides only the mount 47 by the reading-section driving motor 58. The focusing control can be carried out such that, for example, the contrast of the film image read by the line CCD 116 becomes maximum (i.e., a so-called image contrast technique). Alternatively, a distance sensor which measures by infrared rays or the like the distance between the photographic film 22 and the lens unit 50 (or the line CCD 116) may be provided, and focusing control can be carried out on the basis of the distance detected by the distance sensor instead of on the basis of the data of the film image.

A timing generator 74 is connected to the line CCD 116. The timing generator 74 generates various timing signals (clock signals) for operating the line CCD 116, A/D converters 82, which will be described later, and the like. Signal output terminals of the line CCD 116 are connected to the A/D converters 82 via amplifiers 76, and the signals outputted from the line CCD 116 are amplified by the amplifiers 76 and are converted into digital data by the A/D converters 82.

The output terminals of the A/D converters 82 are each connected to the image processing section 16 via correlation double sampling circuits (CDS) 88 and an interface (I/F) circuit 90 in that order. Each CDS 88 carries out sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in the CCD cells) are sequentially outputted, as scan image data, to the image processing section 16 via the I/F circuit 90.

Reading signals of R, G, and B are outputted in parallel from the line CCD 116, and therefore, three signal processing systems each including the amplifier 76, the A/D converter 82, and the CDS 88 are provided. Image data of R, G, and B are outputted in parallel, as scan image data, to the image processing section 16 from the I/F circuit 90.

Further connected to the image processing section 16 are the above-described display 18, keyboards 12A and 12B, and the film carrier 38.

Next, operation of the present embodiment will be described.

Figure 7:
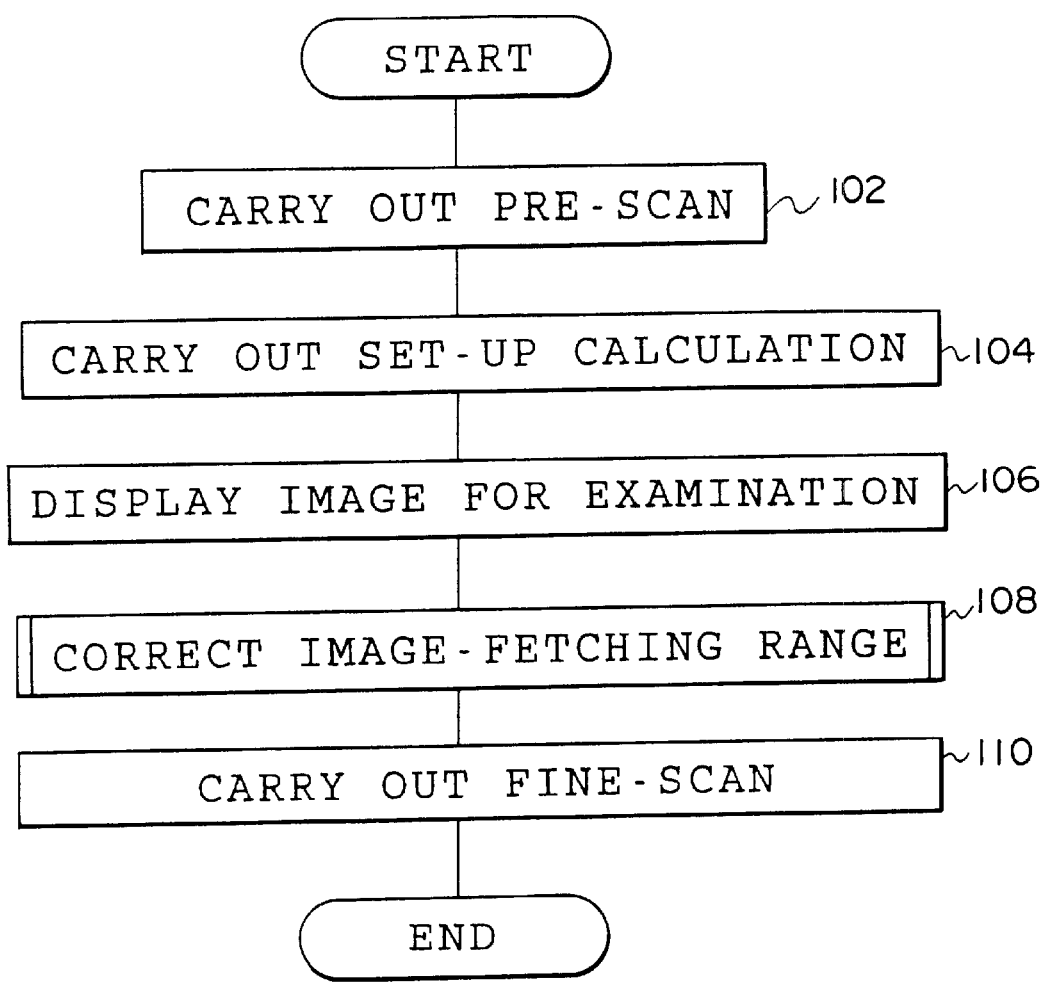
FIG. 7 is a flow chart which shows a main control routine in the image reading apparatus according to a preferred embodiment of the present invention.

FIG. 7 shows a main control routine of the line CCD scanner 14 relating to the present embodiment.

In step 102 shown in FIG. 7, the respective sections are first operated in a preparatory state for the carrying out of a preliminary reading (which will be referred to as pre-scanning hereinafter) to determine optimal exposure conditions, and then pre-scanning is carried out while the photographic film 22 is conveyed at a predetermined constant speed so that the image recorded on the photographic film 22 is read roughly.

Here, the above-described preparatory state refers to a state in which settings are carried out, such as a setting of the magnification of projection (i.e., the optical magnification) onto the line CCD 116 by the lens unit 50, setting of the amount of light irradiated from the lamp 32, setting of the reading period (which is includes the charge accumulating time and the transmitting time) by the line CCD 116, and the like.

During pre-scanning, if photographic films 22 are being processed in units of respective strip-like, elongated photographic films 22, images of a single strip may be read at one time under the same apparatus conditions (optical magnification, amount of irradiated light, reading period, and the like).

When the pre-scan is completed, in step 104, based on the image read at the time of pre-scan, exposure conditions for achieving the optimal image quality are determined (i.e., set-up calculation is carried out). In next step 106, the image read at the time of pre-scan is corrected on the basis of the conditions determined by the set-up process and a positive image in a finished state is displayed on the display 18 (i.e., an image for examination is displayed). An operator examines the positive image on a monitor, manually corrects the density and color of the image and the like as occasion demands, optionally carries out a trimming operation, and designates the image region to be read. Further, when the image is outputted onto a photographic printing paper, the operator also designates the size of the outputted image (i.e., the print size thereof) and the number of outputs (i.e., the number of prints to be formed).

When all of the conditions are determined as described above, in step 108, an image-fetching range is corrected. This process will be described later.

In step 110, fine-scan is carried out. Namely, the operator inputs an instruction for carrying out main-reading (which will be referred to as fine-scanning hereinafter) by using the keyboards or the like.

Then, the process proceeds to a device state which is necessary for the image recorded on the photographic film 22 to be fine-scanned before the photographic film 22, which has been conveyed to the rear end thereof by the pre-scan, is conveyed in a direction opposite to the direction in which the pre-scan was carried out.

Here, the above-described device state necessary for carrying out the fine-scan refers to a state in which the setting of the conveying speed for conveying the photographic film 22, the aforementioned setting of the optical magnification, the aforementioned setting of the amount of irradiated light, and the aforementioned setting of the reading period, and the like are carried out. As a result, optimal exposure conditions can be set for the image frame to be read.

After the transition to the above-described device state has been completed, the line CCD scanner 14 controls the film carrier 38 to convey the photographic film 22 in a direction opposite to the direction in which the pre-scan was carried out, and fine-scans, under the determined exposure conditions and on a frame-by-frame basis, each of the images recorded on the photographic film 22.

The image signal obtained by the line CCD 116 reading the image due to above-described fine-scan, is amplified by the amplifiers 76 and is converted to digital data (image data) by the A/D converters 82.

This image data is processed in such a manner that the deviations of lines (so-called color deviation) in the main-scanning direction read by three lines of the CCD 116 are corrected by the CDSs 88, and the corrected data is inputted to the image processing section 16 via the interface (I/F) circuit 90. The data is converted into a predetermined number of pixels by an unillustrated compression/expansion circuit within the image processing section 16 and becomes the final image data. This final image data is transmitted to an image recording apparatus, which is provided separately from the image reading apparatus of the present invention, and the image is scanned and exposed onto a photographic printing paper which is then subjected to developing processing, resulting in a desired photographic print.

Next, correction processing of the image-fetching range (step 108) will be explained with reference to the image-fetching range correction processing routine shown in FIG. 8.

Figure 8:
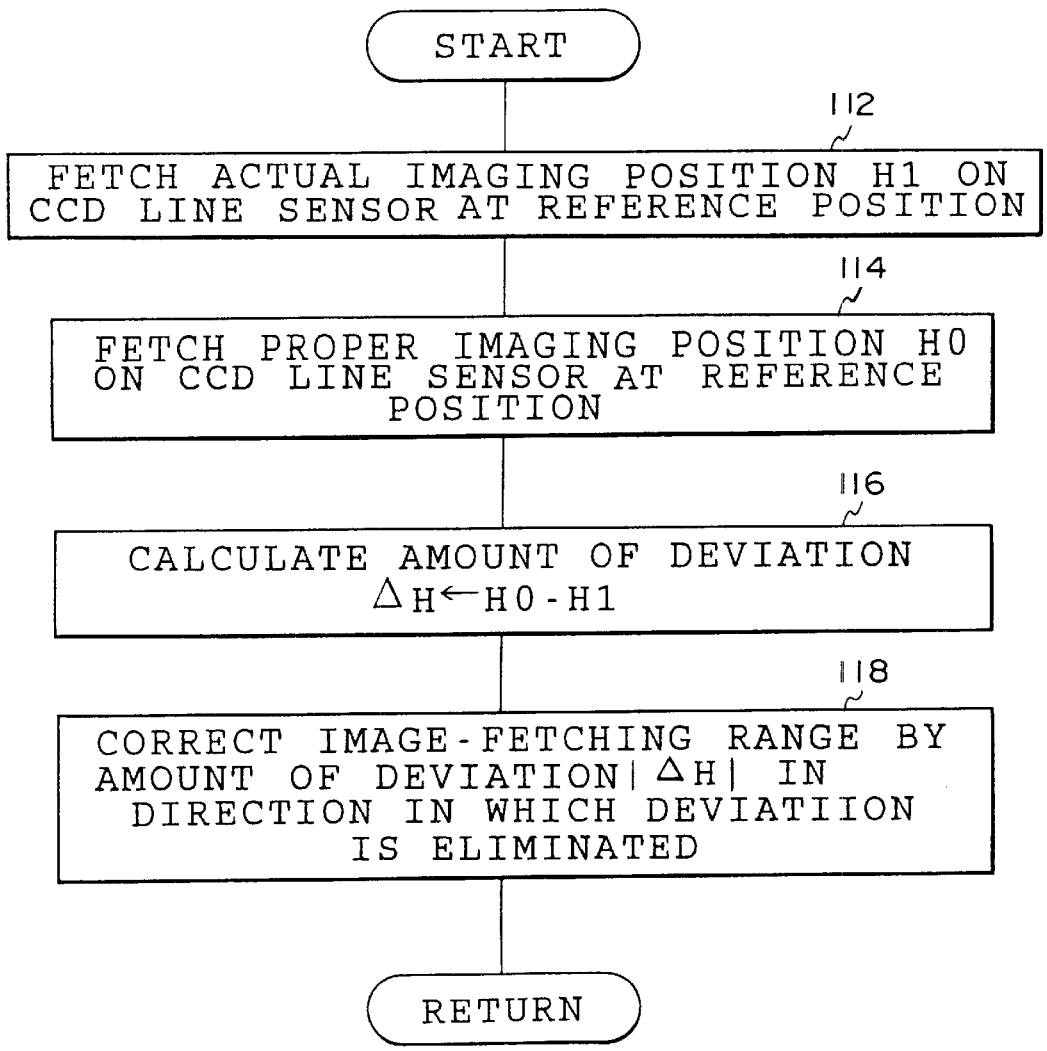
FIG. 8 is a flow chart which shows a correction processing routine of an image-fetching (reading) range.

In step 112 shown in FIG. 8, an actual imaging position H1 on the line CCD 116, at which position H1 the image at a reference position of the photographic photosensitive material is actually imaged onto the reading device, is fetched. The reference position may be any position as long as it is fixed within the range to be read by the line CCD 116. In the present embodiment, the reference position is an unillustrated opening position of the film carrier. Alternatively, the reference position may be a position on a guide which guides the conveying of the photographic film within the film carrier (for example, a position on a chart for the automatic focusing).

For example, as shown in FIG. 11A, the actual imaging position H1 on the line CCD 116 of the reference position (i.e., the aforementioned opening position of the film carrier) corresponds to, for example, the 850th CCD element as counted from one end of the line CCD 116.

In step 114, a proper imaging position H0 on the line CCD 116, at which position H0 the image at a reference position of the photographic photosensitive material should be actually imaged onto the reading device, is fetched. As shown in FIG. 11B, the proper imaging position H0 corresponds to, for example, the 500th CCD element as counted from the one end of the line CCD 116.

In step 116, a value indicating amount of deviation, for example, the amount of deviation itself $\Delta H$ (the difference between the proper imaging position H0 and the actual imaging position H1) is calculated by the formula $\Delta H = H0 - H1$. In a case of the above-described example, the amount of deviation is calculated as follows:

$$\Delta H = 500\ (H0) - 850\ (H1) = -350.$$

In step 118, the image-fetching range is corrected as follows: (the proper image-fetching range)+($-\Delta H$).

Here, the image-fetching range refers to a range of the line CCD (more precisely, a range of the CCD elements) which is selected to be set as an element-active range necessary for reading "the range to be read" of the image of the photographic film. In the present embodiment, the image-fetching range is predetermined at the initial stage as a range, for example, from the 1000th CCD element to the 4000th CCD element from the end.

When the line CCD 116, the imaging lens, the film carrier, or the like deviate from the proper position so that the relative positions of the line CCD and the film carrier, i.e., the relative positions of the line CCD and the photographic film, deviates from the predetermined relative positions, as shown in FIG. 11B, there may be a case in which the CCD elements from the 1000th CCD element to the 4000th CCD element cannot read a portion R of the image G of the photographic film 22.

When the relative positions of the line CCD 116 and the photographic film deviates from the proper positions, a portion R of the image of the photographic film cannot be read, and therefore, moving the positions of the photographic film and the line CCD 116 may be considered. However, a complex mechanical structure is required in order to move the photographic film and the line CCD 116.

In the present embodiment, a range of the CCD elements (i.e., the CCD elements from the 1000th CCD element to the 4000th CCD element), which have initially been selected for reading "the range to be read" of the image of the photographic film, are shifted to a corrected range, which is (the proper image-fetching range)+($-\Delta H$). Accordingly, in accordance with the above-described control signal, the line CCD 116 moves the CCD elements from the 1000th CCD element to the 4000th CCD element, to the CCD elements from the 1000+($-\Delta H$) th CCD element to the 4000+($-\Delta H$) th CCD element, as shown in FIG. 11A.

Namely, when the deviation has been generated due to the line CCD having moved relatively to the photographic film, the deviation is overcome by shifting the image-fetching range in a direction opposite to the direction in which the CCD 116 has deviated, by a number of CCD elements corresponding to the deviation.

In short, on the basis of the difference between the proper imaging position H0 and the actual imaging position H1, the range of the CCD elements to read the photographic film is shifted, in the direction of eliminating the deviation, from the range of the predetermined CCD elements by a number of CCD elements corresponding to the aforementioned difference. Therefore, even if the line CCD 116 and other apparatuses deviate from their respective proper positions, the entire range to be read of the photographic film can reliably be read without the mechanical structure being made complex.

In the above-described embodiment, although correction of the image-fetching range is carried out between pre-scan and fine-scan, the present invention is not limited to the same. The correction of the image-fetching range may be carried out each time before an image frame is read during the fine-scan.

Figure 9:
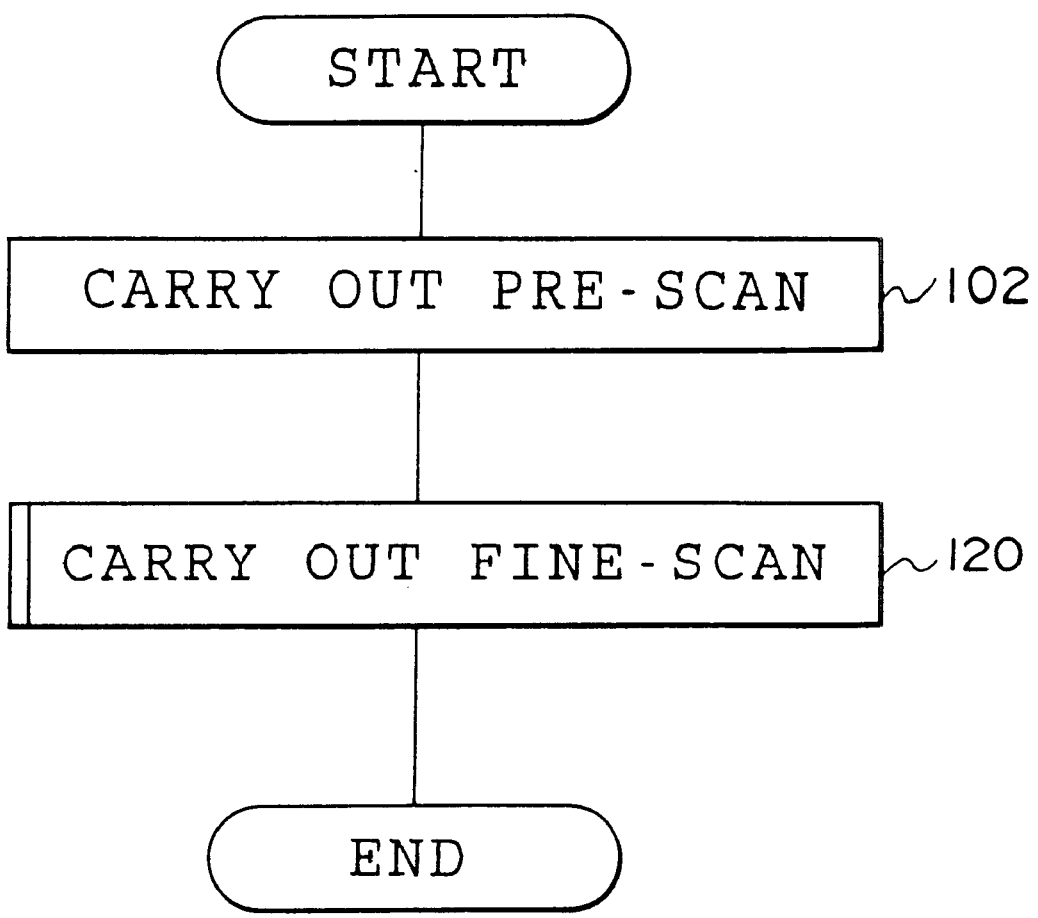
FIG. 9 is a flow chart which shows a main control routine relating to a modified example of the present embodiment.

Namely, as a modified embodiment shown in FIG. 9, after carrying out pre-scan in step 102, in step 120, fine-scan may be carried out in which correction of the image-fetching range is carried out each time before an image frame is read.

Next, this modified example, i.e., fine-scanning, in which correction of the image-fetching range is carried out each time before an image frame is read, will be explained with reference to the fine-scan processing routine shown in FIG. 10.

Figure 10:
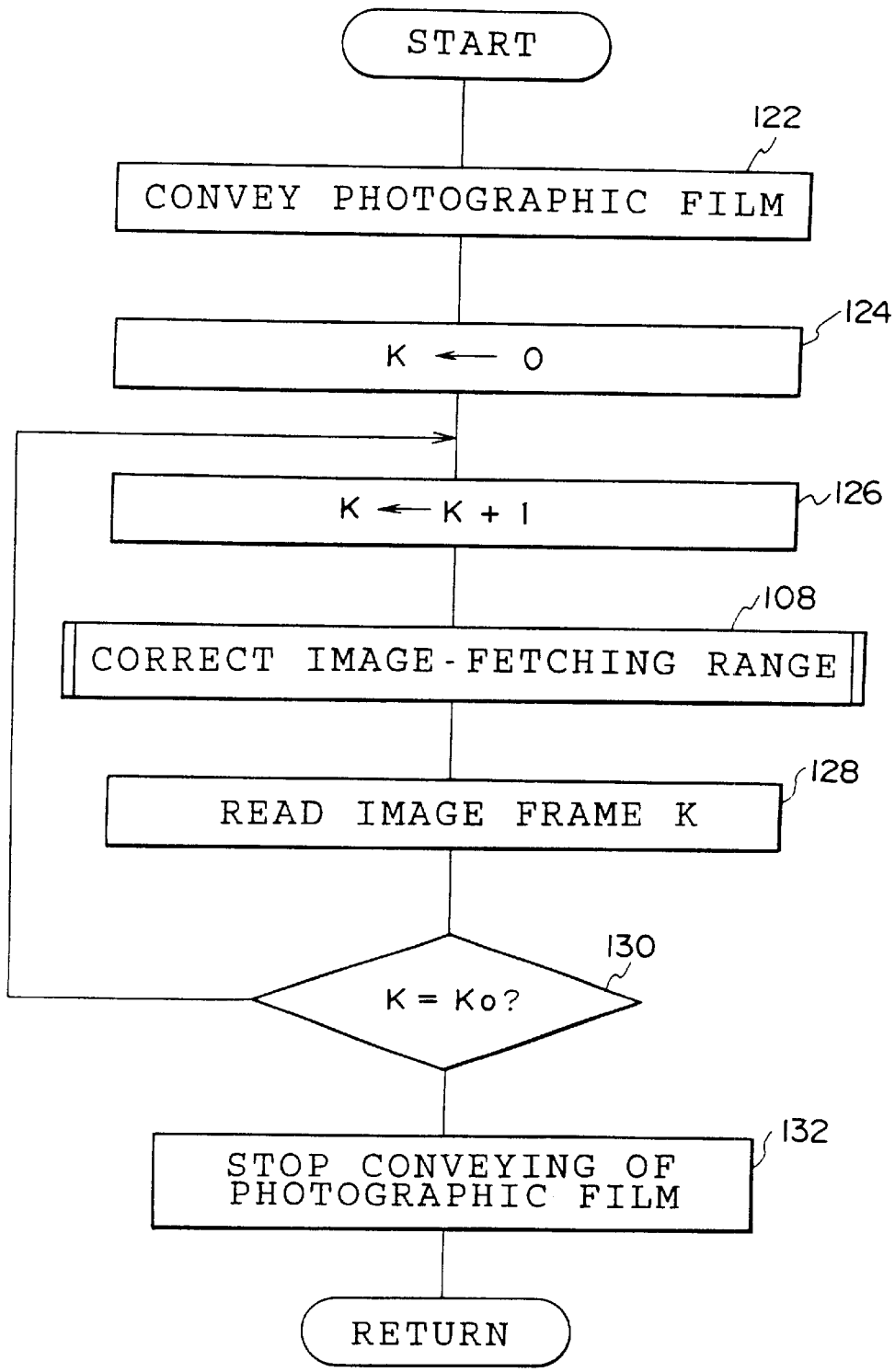
FIG. 10 is a flow chart which shows a fine-scan processing routine in a case in which an image-fetching range is corrected each time an image frame is read.

In step 122 shown in FIG. 10, the photographic film is conveyed. In step 124, a variable K, which is used to identify image frames (obtained on the basis of pre-scan data) recorded on the photographic film, is initialized (set to zero). In step 126, the variable K is incremented by 1.

In next step 108, the above-described correction of the image-fetching range is carried out, and in step 128, the image frame K identified by the variable K is read (i.e., fine-scanned). In step 130, it is determined whether the variable K is equal to the total number of image frames K0 or not. If the variable K is not equal to the total number of image frames K0, the process returns to step 126 and the above-described processes (i.e., steps 126 through 130) are repeated. When the variable K is equal to the total number of image frames K0, the process proceeds to step 132 in which the conveying of the photographic film is stopped and the fine-scan is ended.

The correction of the image-fetching range is carried out before the reading of each image frame, but the present invention is not limited to the same. The correction of the image-fetching range may be carried out each time an image frame is read in the main scan direction. Namely, the processes of the fine-scan carried out in the above-described step 120 may instead be carried out as follows. In the following description, portions which are the same as those of the above-described embodiment are denoted by the same reference numerals, and description thereof is omitted. Only a description of portions different from those of the above-described embodiment will be given.

Figure 13:
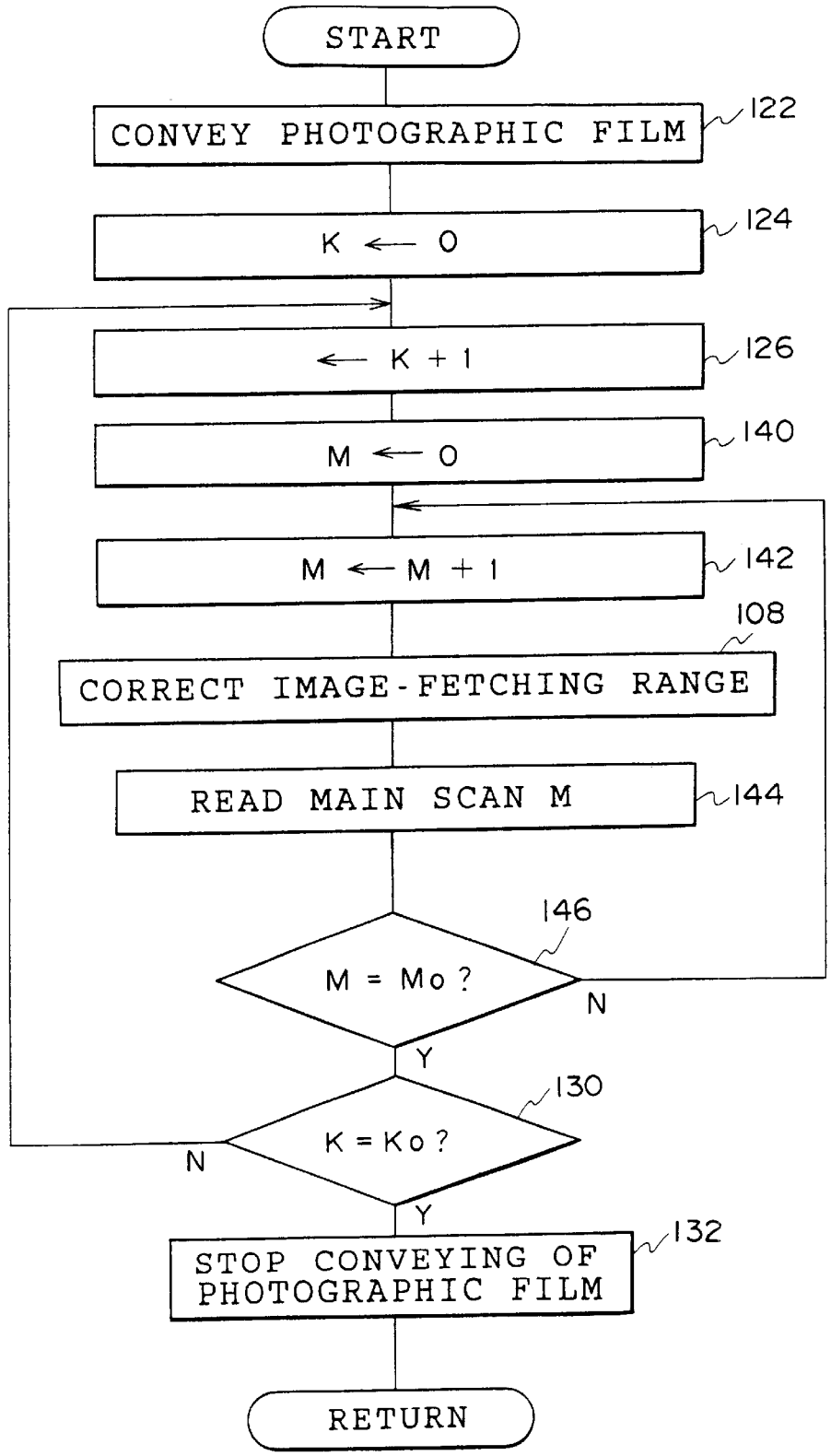
FIG. 13 is a flow chart which shows a fine-scan processing routine in a case (a modified example) in which the correction of the image-fetching range is carried out each time reading of the image frame in a main scan direction is carried out.

As shown in FIG. 13, steps 122~126 are carried out in the same manner as in the above-described embodiment. In step 140, the variable M, which is the number of readings to be incremented by one each time main-scan of a single image frame recorded on the photographic film is carried out, is initialized. In step 142, the variable M is incremented by 1. In step 108, the image-fetching range is corrected as described above. In step 144, the main-scan identified by the variable M is carried out. In step 146, it is determined whether the variable M is equal to the number of readings to be carried out M0 of the total main scan (which is determined on the basis of the pre-scan data). If the variable M is not equal to the number of readings M0 of the total main scan, the process returns to step 142 and the above-described processes (i.e., steps 142~146) are repeated. If the variable M is equal to the number of readings M0 of the total main scan, the same processes as those of the above-described embodiment are carried out in steps 130 and 132 and the fine-scan is ended.

The correction of the image-fetching range may be carried out each time an image is read at a changed magnification. That is to say, each time the reading-section driving motor 58 is controlled, correction of the image-fetching range in step 108 may be carried out.

Moreover, a sensor (not shown) which detects mounting/removal of the film carrier 38 may be provided, and the correction of the image-fetching range in the above step 108 may be carried out, on the basis of the output of the sensor, each time the film carrier 38 is mounted/removed.

The correction of the image-fetching range may be carried out at least one of following points of time: during the time between the pre-scan and the fine-scan; each time before an image frame is read; each time an image frame is read in the main scan direction; each time the film carrier 38 is mounted/removed; and each time an image is read at a changed magnification. When the correction of the image-fetching range is carried out each time before image frame is read or each time an image frame is read in the main scan direction, it is possible to carry out correction of the image-fetching range only for the selected image frame or the selected main scan direction.

In short, in the example described above, the range of the CCD elements, which have initially been selected for reading "the range to be read" of the image of the photographic film, is shifted (i.e., corrected) in a direction of eliminating the deviation generated between the CCD line sensor and the photographic film with respect to their relative positions, by a number of CCD elements corresponding to the amount of deviation.

Figure 12A:
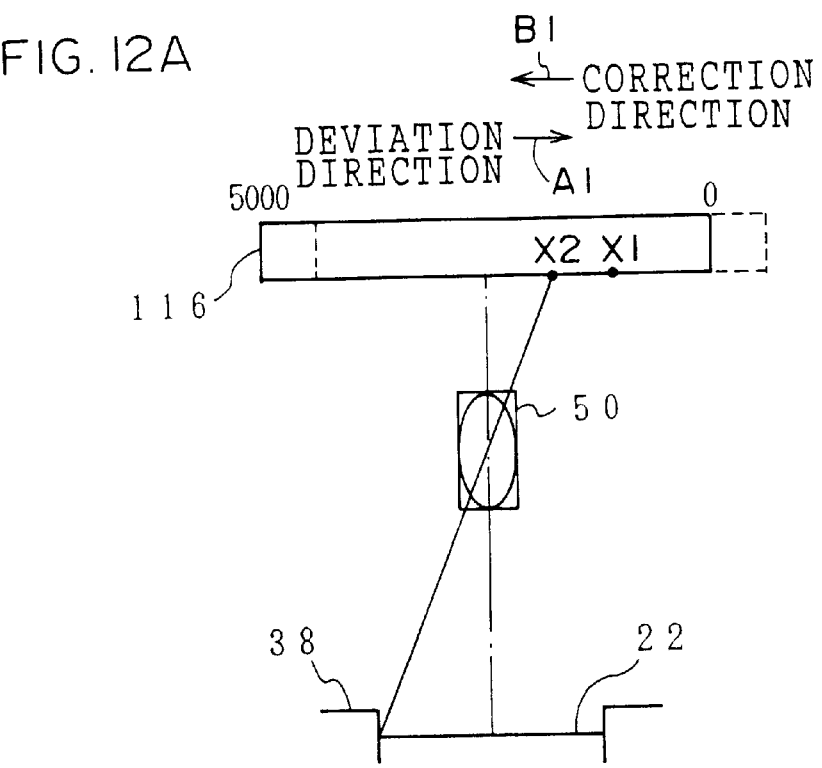
FIGS. 12A and 12B are explanatory views (schematic diagrams) for explaining the correction and deviation directions of the image-fetching range.

When the example shown in FIG. 11A is viewed from the transverse direction, as shown in FIG. 12A, the CCD line sensor has deviated from the proper position to the position indicated by the dotted line (i.e., has deviated in the direction indicated by arrow A1). Accordingly, the imaging position of a predetermined position of the photographic film 22 has moved from a CCD element X1 (for example, the 500th CCD element), which is the proper position, to a CCD element X2 (for example, the 850th CCD element). At this time, since the amount of deviation $\Delta H$ is −350 as described above, CCD elements within the image-fetching range (for example, CCD elements from the 1000th CCD element to the 4000th CCD element) are shifted to CCD elements from the 1000+(−$\Delta H$)th CCD element to the 4000+(−$\Delta H$)th CCD element, i.e., from the 1350th CCD element to the 4350th CCD element. The correction direction is indicated by arrow B1 and is the direction opposite to the deviation direction A1.

Figure 12B:
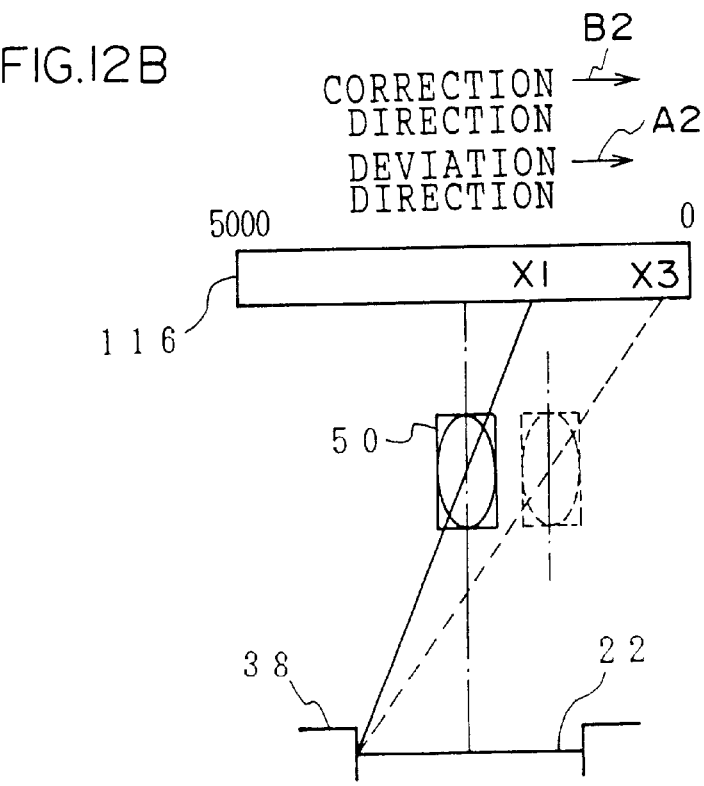

On the other hand, as shown in FIG. 12B, when the imaging lens (the optical axis) 50 is moved relatively in the direction indicated by A2, the imaging position of a predetermined position of the photographic film 22 is moved from the CCD element X1 (for example, the 500th CCD element) to the CCD element X3 (for example, the 200th CCD element). The amount of deviation is $\Delta H=500-200=300$, and therefore, the CCD elements of the image-fetching range (e.g., the 1000th through 4000th elements) are changed to CCD elements from the 1000+(−$\Delta H$)th CCD element to the 4000+(−$\Delta H$)th CCD element, i.e., the 700th CCD element to the 3700th CCD element. In this case, the correction direction B2 is the same direction as the deviation direction A2.

In the above-described example, the above-described correction is not carried out by determining which of the CCD line sensor, the film carrier, and the imaging lens has deviated. It should be noted that the above-described correction is carried out in the direction of the CCD line which is determined in accordance with the sign of the amount of deviation ΔH (H0–H1).

In the above-explained example, the amount of deviation ΔH itself (i.e., the difference between the proper imaging position H0 and the actual imaging position H1) is used as the value indicating the amount of deviation, but the present invention is not limited to the same. The quotient or the product of the proper imaging position H0 and the actual imaging position H1, or the like may be used, in such cases, processing may be carried out as described above by determining the number of CCD elements in accordance with the quotient, product or the like.

For example, when the quotient of the proper imaging position H0 and the actual imaging position H1 is used, the correction direction on the CCD line and the number of CCD elements to be corrected are determined in accordance with the quotient (for example, the correction direction on the CCD line is determined in accordance with whether the quotient is less than or larger than 1).

In the above-described example, when the amount of deviation is calculated, the image-fetching range must be corrected in accordance with the amount of deviation, but the present invention is not limited to the same. For example, on the basis of the proper imaging position H0 and the actual imaging position H1, it may be determined whether the range to be read of the photographic film can be read within the predetermined range of CCD elements, i.e., whether the image-fetching range needs to be changed and if this determination is affirmative, the image-fetching range can be corrected.

Figure 14:
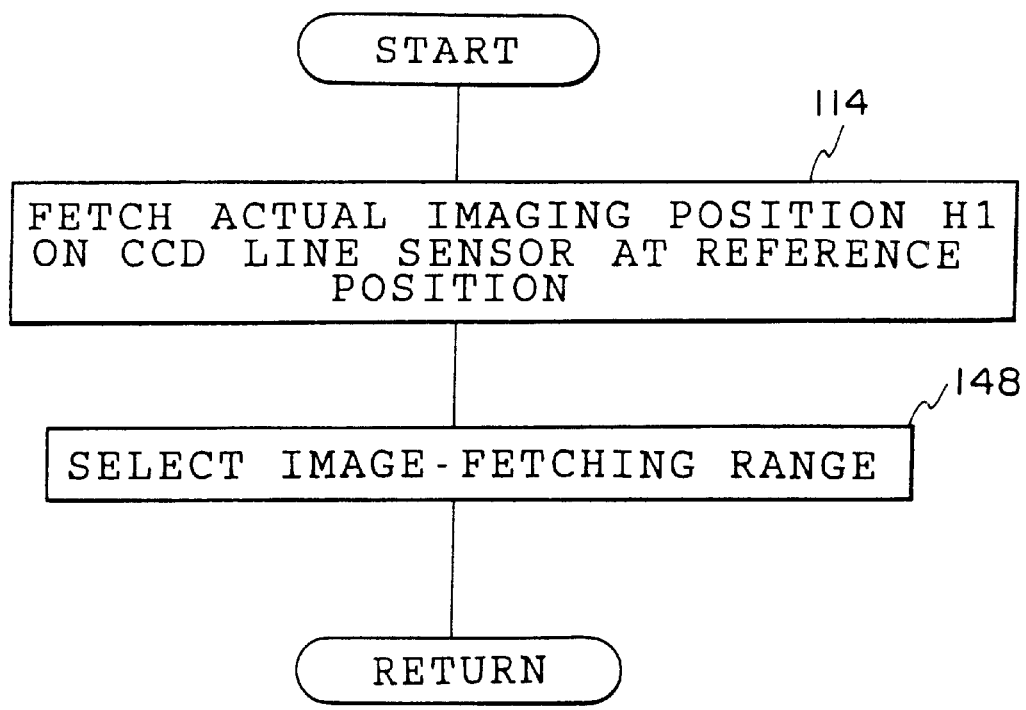
FIG. 14 is a flowchart which shows a process routine for correcting the image-fetching range in accordance with the modified example of FIG. 13.
Figure 15:
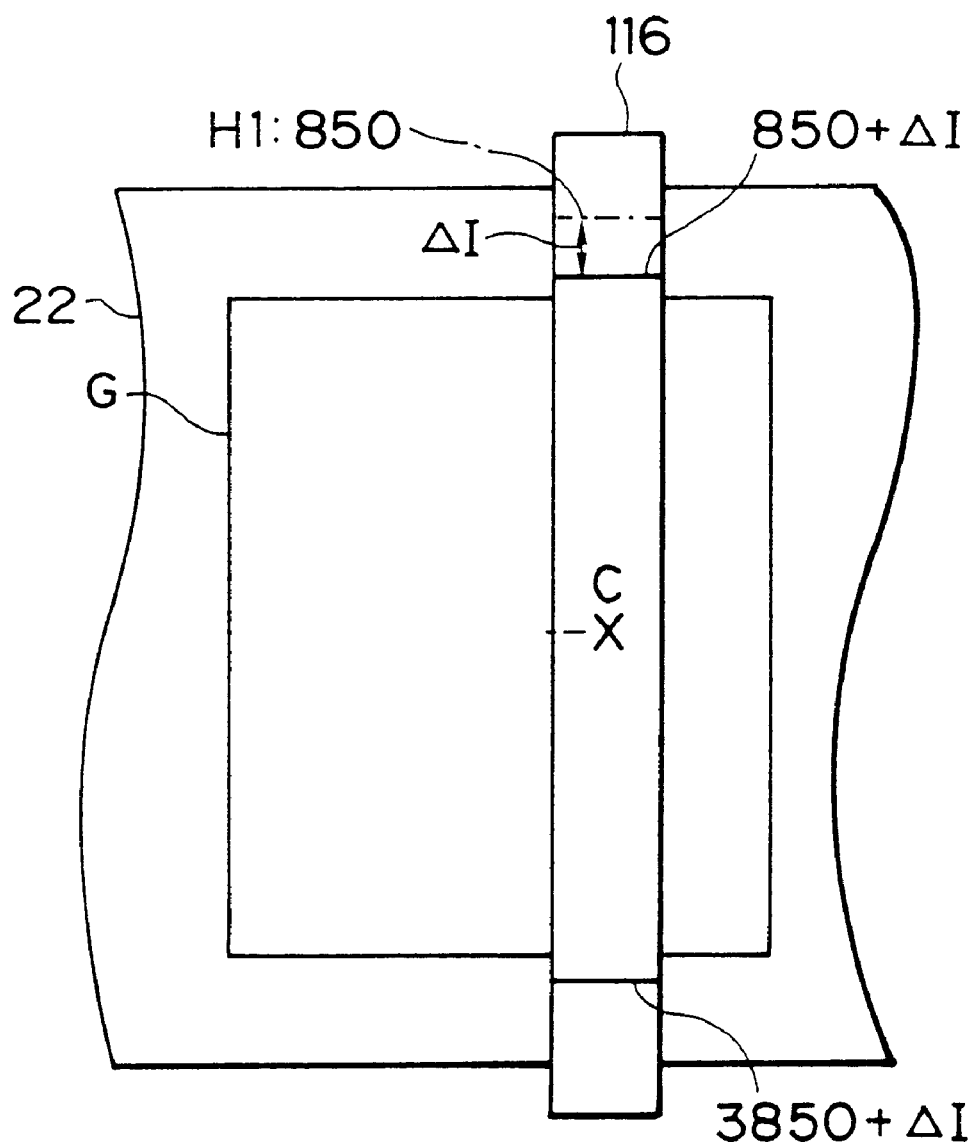
FIG. 15 is an explanatory view (a schematic diagram) for explaining the correction of the image-fetching range by the line CCD scanner in accordance with the modified example of FIG. 13.

In the above-described example, the image-fetching range is determined in advance and is changed in accordance with the calculated amount of deviation, but the image-fetching range may be changed on the basis of a position in which a reference region (in the present embodiment, a specific region which includes an unillustrated opening position of the film carrier) is actually imaged on the CCD line sensor. Namely, the position at which the image frame of the photographic film is actually imaged on the CCD line sensor is spaced away, by a given distance, from a position at which the reference region is actually imaged on the CCD line sensor. Therefore, the range, which is spaced apart by the given distance from the position at which the reference region is actually imaged on the CCD line sensor, may be selected as the image-fetching range. The processes for correcting this image-fetching range are shown in FIG. 14. In step 114, the actual imaging position H1 of the reference region on the line CCD 116 is fetched. Let us assume that this position corresponds to, for example, as shown in FIG. 15, the 850th CCD element on the line CCD 116 at the reference region H1 as counted from one end of the line CCD 116. In next step 148, on the basis of the actual imaging position H1, the image-fetching range spaced from the actual imaging position H1 by a given distance is selected. In the present embodiment, the number of photo-receiving elements necessary for reading an image frame in the main scan direction is 3000, and the distance between the opening position of the film carrier and the end of the image frame is ΔI photo-receiving elements. Accordingly, the 3000 photo-receiving elements from the (850+ΔI)th element to the (3850+ΔI)th element as counted from one end of the line CCD 116 are selected as the image-fetching range.

In the above-described embodiment, the deviation of the image-fetching range in the main scan direction is corrected, but an image-fetching range, overcoming a magnification error due to deviation in the position of the lens unit 50 which is moved at the time of changing magnification, can also be correctingly selected.

Figure 16A:
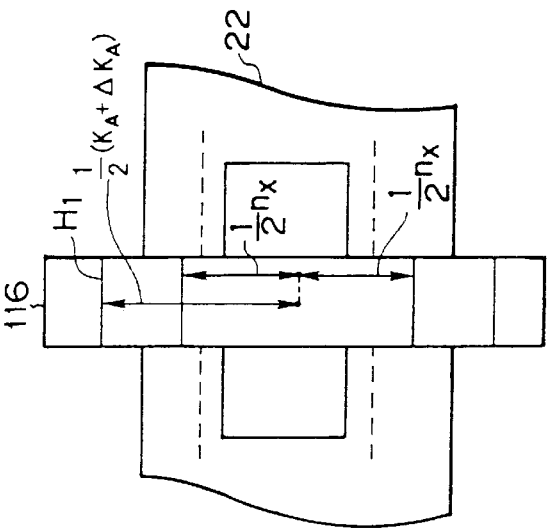
FIGS. 16A–16C are explanatory views (schematic diagrams) for each explaining a modified example in which the correction of the image-fetching range is carried out by the line CCD scanner at the time the magnification is changed.
Figure 16B:
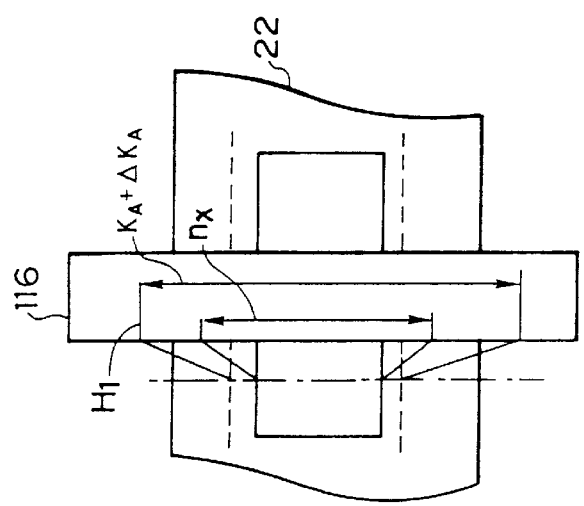

That is to say, as shown in FIG. 16A, given that the numbers of photo-receiving elements necessary for reading the reference region (i.e., the opening position of the film carrier) and the image frame in the main scan direction at a magnification of 1× are denoted by $k_0$ and $n_0$, respectively, then the numbers of photo-receiving elements necessary for reading the opening position of the film carrier and the image frame in the main scan direction at a magnification of A× are denoted by $k_A$ and $n_A$, respectively. However, as described above, due to the deviation in the position of the lens unit 50, the actual number of photo-receiving elements for reading on the line CCD 116 is $k_A+\Delta k_A$ as shown in FIG. 16B. At this time, if the image frame is read by $n_A$ photo-receiving elements, because this number of photo-receiving elements does not correspond to the image frame number, there arises a problem in that there are portions of the image which cannot be read. Moreover, since there may be deviation in the main scan direction as well, the deviation needs to be corrected as a whole. Therefore, the correction of the image-fetching range is carried out as follows.

Figure 17:
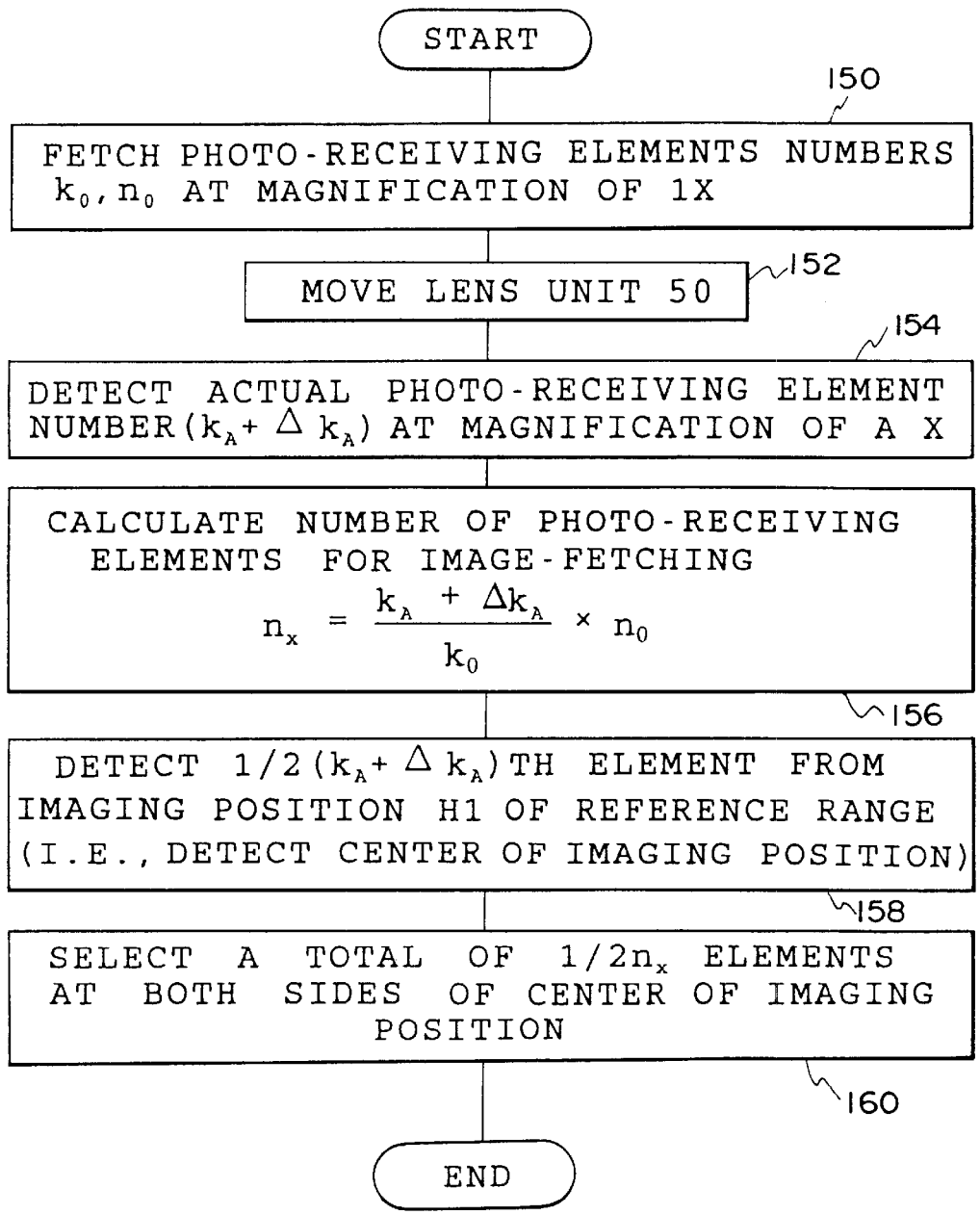
FIG. 17 is a flowchart which shows a process routine for correcting the image-fetching range by the line CCD scanner at the time the magnification is changed.

As shown in FIG. 17, in step 150, the numbers of photo-receiving elements $k_0$ and $n_0$ necessary for reading the reference region (i.e., the region, which includes the opening position of the film carrier) and the image frame in the main scan direction at a magnification of 1× are fetched. In step 152, the lens unit 50 is moved to the reading position for a magnification of A×. In step 154, as shown in FIG. 16B, the actual number of photo-receiving elements $k_A+\Delta k_A$ for reading the reference region at a magnification of A× is detected. Here, the number of proper photo-receiving elements required for reading the opening position of the film carrier at a magnification of A× is $k_A$. However, due to the deviation in position of the lens unit 50 and the like, actually, the number of photo-receiving elements for reading may not be $k_A$. Accordingly, the actual number of photo-receiving elements necessary for reading the opening position of the film carrier is detected, and the actual magnification is calculated. In step 156, on the basis of the actual number of photo-receiving elements $k_A+\Delta k_A$ for reading the opening position of the film carrier, the number of image-fetching elements $n_x$ corresponding to the actual magnification is calculated. The actual magnification is $(k_A+\Delta k_A)/k_0$ and the number of image-fetching elements at a magnification of 1× is $n_0$. Therefore, $n_x$ is calculated by the formula $n_x=n_0\times(k_A+\Delta k_A)/k_0$.

In the above-described example, the number of image-fetching elements nX corresponding to the actual magnification is calculated, on the basis of the number of photo-receiving-elements $k_0$ necessary for reading the opening position of the film carrier at a magnification of 1×, the number of photo-receiving elements $n_0$ necessary for reading the image frame in the main scan direction at a magnification of 1×, and the number of photo-receiving elements $(k_A+\Delta k_A)$ actually necessary for reading the opening position of the film carrier. However, the ratio $n_z/k_z$ of the number of photo-receiving elements $k_z$ necessary for reading the opening position of the film carrier at an arbitrary magnification (i.e., a magnification of Z×) to the number of photo-receiving elements $n_z$ necessary for reading the image frame in the main scan direction at the magnification of Z× is equal to $n_0/k_0$. Accordingly, the number of image-fetching elements $n_x$ corresponding to the current magnification is calculated by the formula $n_x=n_z\times(k_A+\Delta k_A)/k_z$, on the basis of $k_z$ and $n_z$ for a predetermined arbitrary magnification and the number of photo-receiving elements ($k_A+\Delta k_A$) actually necessary for reading the opening position of the film carrier.

Figure 16C:
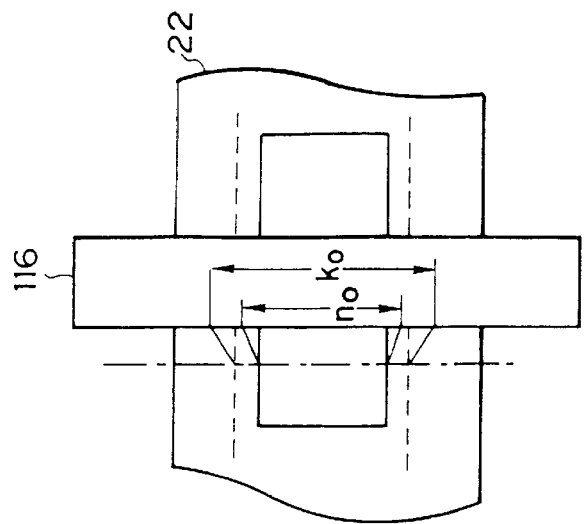

In step 158, the ½($k_A+\Delta k_A$)th photo-receiving element as counted from the imaging position at one end of the opening position of the film carrier is detected. The boundary between the detected photo-receiving element and the ½($k_A+\Delta k_A$)+1st photo-receiving element becomes a center of the imaging position on the line CCD 116. If this position is the center of the image-fetching position on the line CCD 116, the deviation in the main scan direction can be corrected. In step 160, as shown in FIG. 16C, ½($n_A+\Delta n_A$) elements at each side of the center of imaging position are selected. As a result, an image-fetching range which has overcome the magnification error and in which the deviation in the main scan direction is corrected, can be selected.

In the above-described example, the image-fetching range is corrected by selecting an image-fetching range corresponding to the actual magnification. Because the distance and direction necessary for moving the lens unit 50 to correct the magnification error to achieve the proper magnification are determined in accordance with the magnification error, the actual magnification is calculated by the above-described processes, and on the basis of the magnification error, the lens unit 50 may be moved to the position at which proper magnification can be obtained. As a result, the photographic film can be read at proper magnification.

In the embodiment explained above, the line CCD 116 is used, but the present invention is not limited to the same. The image-fetching range can be corrected by using a CCD area scanner 500. Namely, as shown in FIG. 18, the actual imaging position H1*a* of a reference position included in the reference range (i.e., two orthogonally intersecting sides of the opening portion of the film carrier) in the widthwise direction of the photographic film and the actual imaging position H1*b* thereof in the conveying direction of the photographic film are read at the CCD area scanner 500. The amounts of deviation ΔHa and ΔHb of the reference range from the proper imaging position H0*a* in the widthwise direction of the photographic film and from the proper imaging position H0*b* in the conveying direction of the photographic film are calculated, and the image-fetching range can be shifted in directions of eliminating the deviations by the amounts of deviation ΔHa and ΔHb. As shown in FIG. 19, on the basis of the actual imaging position H1*a* of the reference position included in the reference region in the widthwise direction of the photographic film and the actual imaging position H1*b* of the reference position included in the reference region in the conveying direction of the photographic film, an image-fetching range, which is spaced from these respective positions by given distances, can be selected. That is to say, the position at which the image frame of the photographic film is actually imaged on the area CCD 500 is spaced from the actual imaging positions of the reference positions included in the reference region (i.e., two orthogonally intersecting sides of the opening position of the film) by given distances (ΔIa and ΔIb). Therefore, a predetermined number of photo-receiving elements separated, by distances ΔIa (in the photographic film widthwise direction) and ΔIb (in the photographic film conveying direction) from the positions of the reference positions included in the reference region (i.e., two orthogonally intersecting sides of the film opening portion), can be selected as the image-fetching range. The area CCD 500 may be used for correcting the image-fetching range corresponding to the magnification error. The appropriate number of image-reading photo-receiving elements are calculated for the widthwise direction of the photographic film and the conveying direction of the photographic film, the actual center of the imaging position is detected, and then the image reading range is selected in the same way as in the case of the above-described line CCD.

In the present invention, while conveying a black-and-white photographic film, only one line of photo-receiving elements in the area CCD 500 is used to read the black-and-white photographic film. The three lines of photo-receiving elements of the area CCD 500 are used for reading red (R), green (G), and blue (B) while conveying a photographic film so as to read a color photographic film.

The present invention is not limited to CCDs, and other photoelectric conversion elements (for example, MOS type photographic conversion elements) may be used.

As explained above, the present invention has a superior effect in that, because as a plurality of photo-receiving elements which read a photographic photosensitive material are determined on the basis of a position at which a reference position is actually read, even if the reading means deviates from its proper position, the entire range to be read of the photographic photosensitive material can be read.

What is claimed is:

1. An image reading apparatus, comprising:

reading means comprising a plurality of reading sections, wherein the reading sections read an image of a reference position which is used as a reference with respect to a photographic photosensitive material, and determination means for determining a range of reading sections for reading the photosensitive material, wherein said determination means comprises:

calculation means which calculates a value which indicates an amount of deviation between an actual reading position, at which the reference position is actually imaged and read by said reading means, and a proper reading position, at which the reference position should be imaged and read; and changing means which changes the range of the reading sections selected for reading the photographic photosensitive material from an initially determined range of the plurality of the reading sections to another range, on the basis of the value indicating the amount of deviation calculated by said calculation means, wherein said reading means carries out preliminary reading and main reading of the photographic photosensitive material conveyed by a conveying means, and said determination means carries out said determination of said range of reading sections, said determination comprises calculating a value that indicates the amount of deviation between said actual reading position and said proper reading position and changing said range of reading sections from the initially determined range to another range on the basis of the value indicating the amount of deviation, after said reading means completes the preliminary reading and before said reading means begins the main reading.

2. The image reading apparatus according to claim 1, wherein said changing means changes the range of the reading sections selected for reading the photographic photosensitive material in a direction in which the amount of deviation is eliminated, so that at least the predetermined range to be read of the photographic photosensitive material is read by the selected range of plural reading sections.

3. The image reading apparatus according to claim 1, further comprising:

conveying means which conveys the photographic photosensitive material, wherein the reading sections are disposed in a direction intersecting a conveying direction of the photographic photosensitive material, and said reading means reads the photographic photosensitive material conveyed by said conveying means each time the photographic photosensitive material stops at a predetermined reading position.

4. The image reading apparatus according to claim 1, wherein further comprising:

conveying means which conveys the photographic photosensitive material, wherein the reading sections are disposed in a plurality of rows in a direction intersecting a conveying direction of the photographic photosensitive material, and said reading means reads the photographic photosensitive material when the photographic photosensitive material is being conveyed by said conveying means.

5. The image reading apparatus according to claim 4, wherein said reading means reads the photographic photosensitive material by at least one row of the reading sections disposed in a plurality of rows.

6. The image reading apparatus according to claim 1, wherein the reference position of the photographic photosensitive material corresponds to a particular position of a conveying means at which the photographic photosensitive material is set.

7. The image reading apparatus according to claim 1, wherein a proper reading position of the reference position is a reading section at a particular position, and deviation between the reading section at said actual reading position and the reading section at the particular position is the amount of deviation.

8. The image reading apparatus according to claim 7, wherein said proper reading position and said actual reading position are respectively expressed by numerical values, and a difference between a value expressing said proper reading position and a value expressing said actual reading position is the amount of deviation.

9. The image reading apparatus according to claim 7, wherein said proper reading position and said actual reading position are respectively expressed by numerical values, and a quotient between a value expressing said proper reading position and a value expressing said actual reading position is the amount of deviation.

10. The image reading apparatus according to claim 7, wherein said proper reading position and said actual reading position are respectively expressed by numerical values, and a product of between a value expressing said proper reading position and a value expressing said actual reading position is the amount of deviation.

11. The image reading apparatus according to claim 1, wherein said determination means carries out said determination for each of the images recorded on the photographic photosensitive material during at least one of the following points in time: before each image frame is read; each time an image frame is read in the main scan direction; each time said conveying means is mounted each time said conveying means is removed; and each time an image is read at a changed magnification.

12. The image reading apparatus according to claim 1, further comprising:

imaging means which is able to image an image recorded on the photographic photosensitive material onto said reading means at an enlarging/reducing magnification; and adjusting means which adjusts said imaging means such that the image recorded on the photographic photosensitive material is imaged onto said reading means at an enlarging/reducing magnification, wherein said determination means carries out said determination of said range of reading sections each time said imaging means is adjusted by said adjusting means.

13. The image reading apparatus according to claim 12, wherein said reading means comprises photo-receiving-elements-for-reading, and on the basis of a number of photo-receiving-elements-for-reading necessary for said reading means to read at a predetermined magnification a reference region including said reference position, a number of photo-receiving-elements-for-reading necessary for said reading means to read the photographic photosensitive material at a magnification of 1×, and an actual number of photo-receiving-elements-for-reading necessary for said reading means to read the reference region after magnification has been changed an appropriate number of photo-receiving-elements-for-reading necessary for said reading means to read the photographic photosensitive material after magnification is changed is calculated, and a range of a plurality of photo-receiving elements to be read the photographic photosensitive material is determined by said determination means on the basis of said calculated number of photo-receiving-elements-for-reading necessary for reading the photographic photosensitive material, the actual number of photo-receiving-elements-for-reading necessary for said reading means to read the reference region after the magnification has been changed, and the position of photo-receiving elements which read the reference region.

14. The image reading apparatus according to claim 1, further comprising:

imaging means which is able to image an image recorded on the photographic photosensitive material onto said reading means at an enlarging/reducing magnification;

adjusting means which adjusts said imaging means such that the image recorded on the photographic photosensitive material is imaged onto said reading means at an enlarging/reducing magnification; and control means which controls the position of said adjusting means so that said imaging means is adjusted, on the basis of the number of photo-receiving-elements-for-reading necessary for said reading means to read at a predetermined magnification the reference region including said reference position, a number of photo-receiving-elements-for-reading necessary for said reading means to read the photographic photosensitive material at a predetermined magnification and the actual number of photo-receiving-elements-for-reading necessary for said reading means to read the reference region after the magnification has been changed.

15. The image reading apparatus according to claim 1, wherein said reading means is a charge coupled device.

16. The image reading apparatus according to claim 15, wherein the charge coupled device comprises a red line sensor, a green line sensor and a blue line sensor.

17. The image reading apparatus according to claim 1, wherein said determination means comprises a timing generator coupled to said reading means.

18. The image reading apparatus according to claim 4, wherein said conveying means is a film carrier.

19. The image reading apparatus according to claim 12, wherein said imaging means is a lens, and said adjusting means is lens driving motor.

20. An image reading apparatus, comprising:

reading means comprising a plurality of reading sections, wherein the reading sections read an image of a reference position which is used as a reference with respect to a photographic photosensitive material;

determination means for determining a range of reading sections for reading the photosensitive material;

imaging means which is able to image an image recorded on the photographic photosensitive material onto said reading means at an enlarging/reducing magnification; and adjusting means which adjusts said imaging means such that the image recorded on the photographic photosensitive material is imaged onto said reading means at an enlarging/reducing magnification, wherein said determination means carries out said determination each time said imaging means is adjusted by said adjusting means, and wherein said reading means comprises photo-receiving-elements-for-reading, and on the basis of a number of photo-receiving-elements-for-reading necessary for said reading means to read at a predetermined magnification a reference region including said reference position, a number of photo-receiving-elements-for-reading necessary for said reading means to read the photographic photosensitive material at a magnification of 1×, and an actual number of photo-receiving-elements-for-reading necessary for said reading means to read the reference region after magnification has been changed an appropriate number of photo-receiving-elements-for-reading necessary for said reading means to read the photographic photosensitive material after magnification is changed is calculated, and a range of a plurality of photo-receiving elements to be read the photographic photosensitive material is determined by said determination means on the basis of said calculated number of photo-receiving-elements-for-reading necessary for reading the photographic photosensitive material, the actual number of photo-receiving-elements-for-reading necessary for said reading means to read the reference region after the magnification has been changed, and the position of photo-receiving elements which read the reference region.

21. An image reading apparatus, comprising:

reading means comprising a plurality of reading sections, wherein the reading sections read an image of a reference position which is used as a reference with respect to a photographic photosensitive material;

determination means for determining a range of reading sections for reading the photosensitive material;

imaging means which is able to image an image recorded on the photographic photosensitive material onto said reading means at an enlarging/reducing magnification;

adjusting means which adjusts said imaging means such that the image recorded on the photographic photosensitive material is imaged onto said reading means at an enlarging/reducing magnification; and control means which controls the position of said adjusting means so that said imaging means is adjusted, on the basis of the number of photo-receiving-elements-for-reading necessary for said reading means to read at a predetermined magnification the reference region including said reference position, a number of photo-receiving-elements-for-reading necessary for said reading means to read the photographic photosensitive material at a predetermined magnification and the actual number of photo-receiving-elements-for-reading necessary for said reading means to read the reference region after the magnification has been changed.

* * * * *